US011895473B2

(12) United States Patent
Mata Magana et al.

(10) Patent No.: US 11,895,473 B2
(45) Date of Patent: Feb. 6, 2024

(54) ELECTRONIC DEVICE

(71) Applicant: Amazon Technologies, Inc., Seattle, WA (US)

(72) Inventors: Giovanni Mata Magana, East Palo Alto, CA (US); Alexander David Savello, Palo Alto, CA (US); Chia Hung Kuo, San Jose, CA (US); Thompson Quang-Tue Nguyen, San Jose, CA (US); Danny Chan, Fremont, CA (US); Albert John Yu Sam Chua, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/193,334

(22) Filed: Mar. 5, 2021

(65) Prior Publication Data

US 2021/0195333 A1 Jun. 24, 2021

Related U.S. Application Data

(63) Continuation of application No. 16/358,476, filed on Mar. 19, 2019, now Pat. No. 10,979,810.

(51) Int. Cl.
*H04R 5/02* (2006.01)
*H04R 1/02* (2006.01)
(Continued)

(52) U.S. Cl.
CPC .......... *H04R 5/02* (2013.01); *F21V 33/0056* (2013.01); *H04R 1/028* (2013.01); *H04R 1/403* (2013.01); *H04R 5/027* (2013.01)

(58) Field of Classification Search
CPC .......... H04R 5/02; H04R 5/027; H04R 1/025; H04R 1/028; H04R 1/02; H04R 1/035;
(Continued)

(56) References Cited

U.S. PATENT DOCUMENTS 2,143,175 A 1/1939 Waite
4,006,308 A 2/1977 Ponsgen
(Continued)

FOREIGN PATENT DOCUMENTS

CN 207235023 U * 4/2018
CN 207235023 U 4/2018
WO WO2016028264 A1 2/2016

OTHER PUBLICATIONS

PCT Search Report and Written Opinion dated Aug. 6, 2020 for PCT Application No. PCT/US20/22562, 19 pages.
(Continued)

*Primary Examiner* — Leshui Zhang
(74) *Attorney, Agent, or Firm* — Lee & Hayes, P.C.

(57) ABSTRACT

An audio device having a housing including a first loudspeaker disposed in the housing and oriented to emit sound towards a top of the housing, a second loudspeaker disposed in the housing and oriented to emit sound towards a bottom of the housing, and a third loudspeaker disposed in the housing and oriented to emit sound radially outward from the housing of the audio device. Embodiments may include a microphone array disposed proximate the top of the audio device and encircling the first loudspeaker.

20 Claims, 19 Drawing Sheets

(51) Int. Cl.
*H04R 1/40* (2006.01)
*H04R 5/027* (2006.01)
*F21V 33/00* (2006.01)

(58) Field of Classification Search
CPC ...... H04R 1/2811; H04R 1/24; H04R 1/2803; H04R 1/2842; H04R 1/1008; H04R 1/30; H04R 1/20; H04R 1/345; H04R 1/403; H04R 1/40; H04R 9/06; H04R 2201/401; F21V 33/0056; G06F 3/0202
USPC ......... 381/61, 300, 301, 302, 303, 304, 305, 381/306, 307, 308, 26, 27, 28, 7, 80, 81, 381/85, 87, 89, 332, 333, 336, 111, 116, 381/117, 119, 120, 122, 123; 700/94
See application file for complete search history.

(56) References Cited

U.S. PATENT DOCUMENTS

| | | | | |
|---|---|---|---|---|
| 8,175,304 | B1 * | 5/2012 | North | H04R 5/02 381/89 |
| 8,807,269 | B1 * | 8/2014 | Lucy | H04R 1/2888 181/148 |
| 9,060,224 | B1 | 6/2015 | List | |
| 2014/0219491 | A1 * | 8/2014 | Ludlum | H04R 1/02 381/387 |
| 2017/0238090 | A1 | 8/2017 | Johnson et al. | |
| 2018/0091889 | A1 * | 3/2018 | Huwe | F21V 23/0485 |
| 2018/0324520 | A1 | 11/2018 | Yeh | |
| 2018/0343521 | A1 | 11/2018 | Ashrafzadeh | |
| 2018/0359567 | A1 | 12/2018 | Sondergaard | |
| 2019/0132672 | A1 | 5/2019 | Dick et al. | |
| 2020/0280813 | A1 * | 9/2020 | Christoph | H04S 7/30 |
| 2020/0304914 | A1 | 9/2020 | Mata Magana et al. | |

OTHER PUBLICATIONS

Office Action for U.S. Appl. No. 16/358,476, dated Feb. 7, 2020, Magana, “Electronic Device”, 18 Pages.
Office Action for U.S. Appl. No. 16/358,476, dated Jun. 22, 20, Magana, “Electronic Device”, 21 Pages.
Office Action for U.S. Appl. No. 16/358,476, dated Sep. 30, 2020, Magana, “Electronic Device”, 27 Pages.
The PCT Invitation to Pay Additional Fees mailed on Jun. 15, 2020 for PCT Application No. PCT/US2020/022562, 13 pages.

* cited by examiner

ELECTRONIC DEVICE

CROSS-REFERENCE TO RELATED APPLICATION

This patent application claims priority to U.S. patent application Ser. No. 16/358,476, filed Mar. 19, 2019, which is fully incorporated herein by reference.

BACKGROUND

Homes are becoming more connected with the proliferation of computing devices, such as desktop and laptop computers, tablets, entertainment systems, and portable communication devices. As these computing devices continue to evolve, many different ways have been introduced to allow users to interact with the computing devices, such as through touch, gestures, and speech. With speech interaction, the computing devices may be operated essentially "hands free."

To implement speech interaction, the computing devices are commonly equipped with a microphone to receive voice input from a user and a loudspeaker to emit audible responses to the user. However, existing computing devices often sacrifice sound characteristics for a compact form factor.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
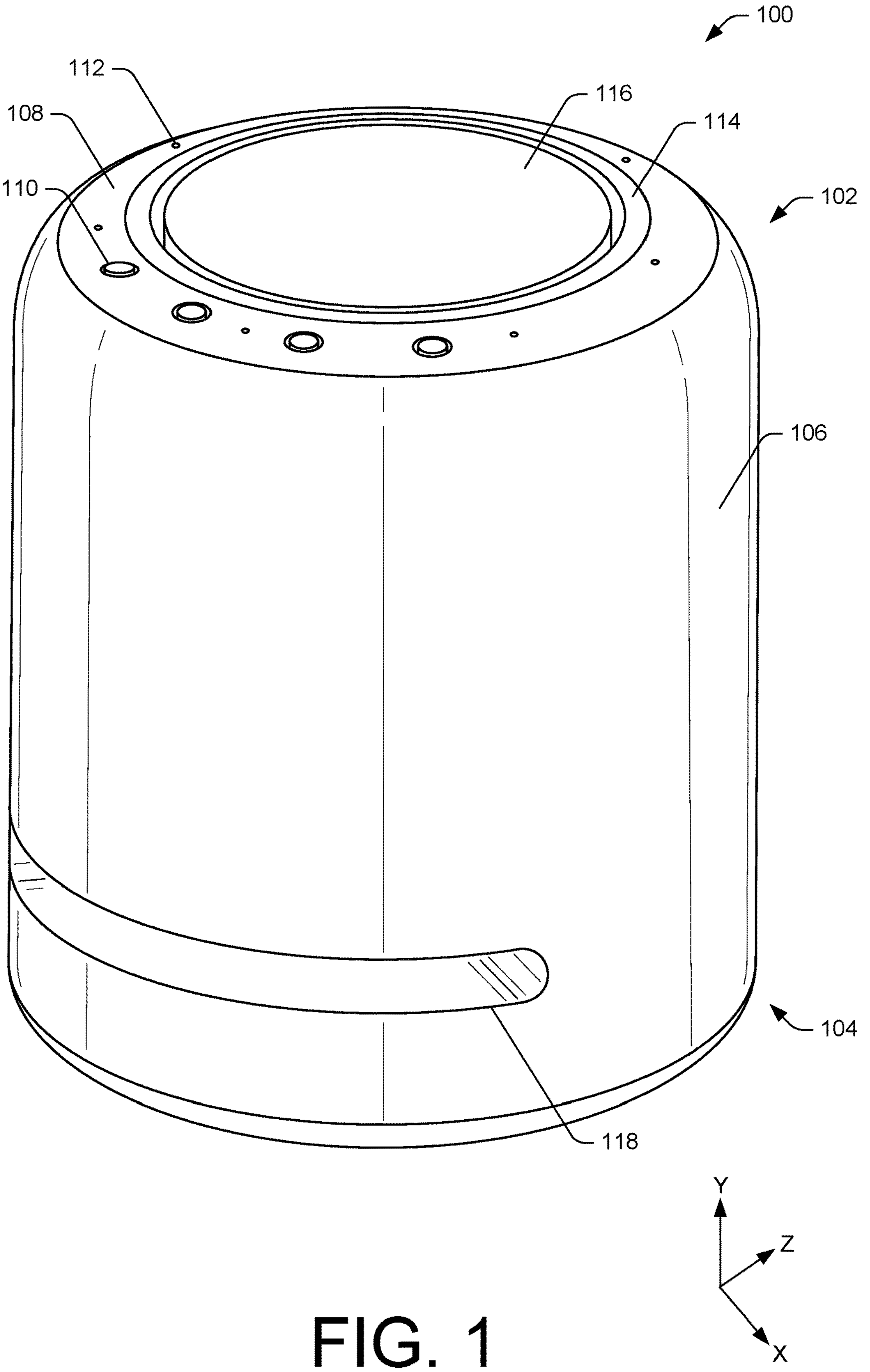
FIG. 1 is a perspective view of an example electronic device, according to an embodiment of the present disclosure.

This application describes an audio device, audio system, or electronic device with improved audio characteristics. In some examples, the electronic device according to this application may include a housing within which are multiple loudspeakers, and/or multiple types of loudspeakers (e.g., woofers, tweeters, mid-range speakers, and/or full-range speakers), arranged to output sound in different directions relative to the electronic device. The loudspeakers may be oriented in multiple different directions relative to the housing. As an example, a first loudspeaker may be located at a top of the electronic device, a second loudspeaker may be located proximate to a bottom of the electronic device, a third loudspeaker may be located at a first side of the electronic device, a fourth loudspeaker may be located at a front of the electronic device, and a fifth loudspeaker may be located at a second side, opposite the first side, of the electronic device. The first loudspeaker may fire towards the top of the electronic device, the second loudspeaker may fire towards the bottom of the electronic device, the third loudspeaker and the fifth loudspeaker may fire radially outward towards opposite sides of the electronic device, and the fourth loudspeaker may fire radially outward towards the front of the electronic device, between the sides of the electronic device. However, in other examples, the loudspeakers may be oriented to fire in additional or alternative directions.

In some instances, the first loudspeaker and the second loudspeaker may be axially aligned within the electronic device, may be aligned with a central longitudinal axis of the electronic device, and/or a housing of the electronic device. The third loudspeaker, the fourth loudspeaker, and the fifth loudspeaker may be radially arranged around the first loudspeaker and/or the second loudspeaker. For instance, the third loudspeaker, the fourth loudspeaker, and/or the fifth loudspeaker may be oriented at different angles relative to the central longitudinal axis of the electronic device to radially disperse sound away from the electronic device (e.g., perpendicular to the central longitudinal axis).

In some instances, the first loudspeaker, the third loudspeaker, and/or the fifth loudspeaker may comprise midrange loudspeakers, while the second loudspeaker may comprise a woofer loudspeaker and the fourth loudspeaker may comprise a tweeter loudspeaker. The placement of the loudspeakers on or about the electronic device, as well as their respective type, may provide a stereo or surround-sound effect when audio is output from the loudspeakers.

In some examples, the electronic device may comprise a cylindrical housing having a smooth, compact, and aesthetic appearance with no visible fasteners or wires. In some instances, the electronic device may include a sleeve that provides the electronic device with its cylindrical shape, and a grill may encase or surround the sleeve. The sleeve may include apertures or orifices aligned with or adjacent to one or more of the loudspeakers to permit sound to pass therethrough. For instance, the orifices may be located proximate to the top of the sleeve, where first orifices are adjacent to the third loudspeaker, second orifices are adjacent to the fourth loudspeaker, and third orifices are adjacent to the fifth loudspeaker.

The grill, in some instances, may include a fabric material that conceals the orifices disposed through the sleeve. In some examples, the grill may be interchangeable to give the electronic device varying appearances or displays.

The housing may provide separate back volumes to one or more of the loudspeakers. The back volumes may enhance audio characteristics of the electronic device without sacrificing a footprint (e.g., size) of the electronic device. In some instances, the back volumes for the one or more loudspeakers may be the same, or substantially the same, while in other instances, the first loudspeaker, the third loudspeaker, and/or the fifth loudspeaker may include different back volumes. For instance, the back volume for the first loudspeaker may be larger than the back volume for the third loudspeaker and the fifth loudspeaker, and/or the back volume for the third loudspeaker may be larger than the back volume for the fifth loudspeaker. In some instances, the second loudspeaker and the fourth loudspeaker may share a cavity that provides back volume to the second loudspeaker and the fourth loudspeaker.

The electronic device, or the housing of the electronic device, may include one or more openings located proximate to the bottom of the electronic device. The one or more openings may provide visibility to one or more of the loudspeakers, such as the second loudspeaker (e.g., woofer) firing towards the bottom of the electronic device. That is, a diaphragm of the second speaker may be exposed via one or more openings, such that when firing, the one or more openings may allow a user may visually see a diaphragm of the second loudspeaker moving. The one or more openings may also permit sound generated by the second loudspeaker to radially disperse outward and away from the electronic device.

In some instances, the one or more openings may be interposed between a top portion and a bottom portion of the electronic device. The top portion and the bottom portion may be communicatively coupled via one or more wires, optical fibers, connectors, and so forth, to exchange processing and/or distribute power, for instance. For instance, the top portion may include the loudspeakers, while the bottom portion may receive power (e.g., via one or more ports, plugs, jacks, etc.) that is supplied to the loudspeakers and/or other components (e.g., microphones, processors, antennas, radios, circuitry, light sources, etc.). The bottom portion may additionally or alternatively include additional components (e.g., microphones, processors, antennas, radios, circuitry, light sources, etc.). To conceal the wires, for instance, one or more legs, conduits, conduits, or columns may extend between the top portion and the bottom portion. The wires may therefore route around the one or more openings located proximate to the bottom of the electronic device, via the one or more columns, to communicatively couple the top portion and the bottom portion. Additionally, the wires (or other electrical components) may be disposed within the columns. In some instances, the electronic device may include a frame or port that provides the one or more openings disposed proximal or proximate to the bottom and/or may at least partially provide a structure through which the wires may route so as conceal the wires from an exterior of the electronic device.

The electronic device may include microphones that capture sound within an environment in which the electronic device resides. In some examples, the microphones may be located within the housing of the electronic device and may be proximal or proximate to the top of the electronic device. In some instances, the microphones may completely or partially encircle, or surround (e.g., ring), the first loudspeaker. The electronic device may also include microphone ports that direct sound or allow sound to reach the microphones. That is, the microphones may receive sound, for instance, user speech, via the microphone ports. In some instances, the microphone ports may be aligned with the microphones, or vice versa.

Including microphones at the top of the electronic device and which encircle the first loudspeaker may introduce complexities in identifying voice commands from a user, for instance (i.e., far-field communication), and distinguishing them from output from the first loudspeaker. In some instances, the electronic device (or another communicatively coupled computing device) may attenuate or cancel noise received from the first loudspeaker (or additional loudspeakers) to accurately identify and recognize user speech, or a voice command, within audio captured by the microphones. Additionally, the microphones and/or the microphone ports may be encased with foam that acoustically seals the microphones to minimize sound received and/or generated via other portions of the electronic device. For instance, the foam may isolate the microphones from one or more of the speakers to minimize an intensity of audio received from the first loudspeaker.

In some instances, the electronic device may include buttons to control or operate the electronic device. The buttons may be located at the top of the electronic device and may correspond to a power button, a wireless connectivity button, a mute button, volume buttons, sync buttons, or any other type of button or control. The buttons may be mechanical (e.g., having physically movable components) and/or electronic (e.g., capacitive sensors, optical sensors, touch screen, or the like).

The electronic device may include a visual indicator(s) to indicate various information to the user, such as providing visual feedback regarding a task or operation being performed by the electronic device. In some instances, the visual indictor may be located on a surface of the electronic device or around at least a portion of the electronic device. For instance, the visual indicator may be located at the top of the electronic device and may encircle the first loudspeaker.

The visual indicator may, in some instances, comprise a light ring. The visual indicator may be illuminated by one or more light sources, such as light emitting diodes (LEDs), residing within the electronic device. In some instances, a light diffuser may be interposed between the light sources and the light ring. The light diffuser may include geometries, such as indentations or protrusions, that limit “hot spots” and/or assist in diffusing light from the light sources to increase internal reflection within the light ring and/or the light diffuser. For example, the light diffuser may include serrated edges or ridges disposed adjacent to the light sources to scatter and disperse the light within the light diffuser and towards the light ring. As another example, the light diffuser may include one or more depressions or thinned regions around its circumference to further diffuse the light in the light ring. Accordingly, in some examples, the light ring may substantially uniformly disperse light within the environment.

In some examples, the electronic device may be configured to support speech interactions with one or more users and respond to user requests. For instance, a user may verbally request the electronic device to perform a particular task, such as to play music. The one or more microphones may capture sound associated with the user speech. In some examples, the user may indicate a request by prefacing the request with a predefined keyword, such as a wake word or trigger expression. The electronic device may capture user speech and may process the user speech to identify a command. Speech processing, such as automatic speech recognition (ASR), natural language understanding (NLU), and speech synthesis may also be performed. However, in some instances, one or more remotely coupled computing device may perform the speech processing and transmit a response or data associated within the user interaction. Upon identifying the command, the electronic device may output a response, cause actions to be performed (e.g., playing music or ordering movie tickets), or elicit feedback from the user. In some instances, content identified in this manner is played through loudspeakers of the electronic device. However, the electronic device may also be configured to provide the content to peripheral devices such as Bluetooth loudspeakers or other peripherals that are nearby or in wired or wireless communication with the electronic device. For example, in some instances, the electronic device may be configured to play music using a home audio system. To accomplish the functions of the electronic device, and the audio input/output processing, the one or more printed circuit boards (PCBs), processors, memory, circuits, transformers, power supplies, network interfaces (e.g., Wi-Fi, Bluetooth, ZigBee, Bluetooth Low Energy (BLE), thermal pads, loudspeakers, antennas, and so forth may mount to or within the housing. In some instances, the antenna for the network interfaces may be positioned proximate to the top of the electronic device to increase a received signal strength of data and/or provide increased connections when communicatively coupling to computing devices The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a perspective view of an electronic device 100. In some instances, the electronic device 100 may include a top 102, a bottom 104, and an exterior surface 106.

The top 102 of the electronic device 100 may include a top cover 108 having one or more buttons 110, one or more microphone ports 112, and a light ring 114. The buttons 110 may be located on a particular side, such as a front, of the electronic device 100. In some instances, the buttons 110 may be disposed at least partially around the light ring 114 and proximate to a perimeter of the electronic device 100. The buttons 110 may also follow a trajectory, arc, or curvature of the exterior surface 106 to angularly span around at least a portion of the top 102 of the electronic device 100. That is, as shown in FIG. 1, the buttons 110 may curve as individual buttons 110 extend around the perimeter of electronic device 100.

The buttons 110 may be interposed between the exterior surface 106 and the light ring 114. Additionally, although FIG. 1 illustrates a particular grouping, arrangement, or location of the buttons 110, in some instances, the buttons 110 may be located elsewhere on the electronic device 100. For instance, the buttons 110 may be located interior to the light ring 114 at or around a center of the electronic device 100. In some instances, an exterior surface of the buttons 110 may include visual indicators that illustrate their associated function (e.g., plus “+” sign to increase volume).

The microphone ports 112 may be disposed through the top cover 108. In some instances, the microphone ports 112 may be spaced around a periphery of the electronic device 100 and may be substantially evenly distributed about a central longitudinal axis of the electronic device 100. As discussed herein, the microphone ports 112 may be disposed around a loudspeaker located at the top 102, or proximate to the top 102, of the electronic device 100. For instance, the electronic device 100 may include a loudspeaker disposed beneath a shroud 116. As such, the microphone ports 112 may be radially disposed around the shroud 116.

As noted above, the shroud 116 may be disposed above (e.g., Y-direction) a loudspeaker residing within the electronic device 100. The shroud 116 may therefore include a material (e.g., loudspeaker fabric) that allows sound generated by the electronic device 100 to pass through the shroud 116.

The microphone ports 112 may assist in transferring or directing sound that is external to the electronic device 100 to one or more microphones located within the electronic device 100. That is, the microphones may receive audio, for instance, user speech, via the microphone ports 112 placed throughout the top cover 108. In some examples, the microphones may be selected and/or designed for sensitivity to near-field and/or far-field to adjust audio captured based on which microphones are closest to the user. Additionally, the microphones and/or the microphone ports 112 may be acoustically sealed to prevent acoustic signals from interfering with those being received via other portions of the electronic device 100. For instance, as shown in FIG. 1, one or more of the microphone ports 112 may be interposed between the one or more of the buttons 110. Further, the microphone ports 112 may be in close proximity to the loudspeaker at the top 102 of the electronic device 100. Using an isolation foam, silicone rubber, and/or double shot TPE seals, for instance, various sounds associated with the click of one or more of the buttons 110, or audio generated by one or more of the loudspeakers of the electronic device 100, may be minimized and acoustically isolated from the microphones. In doing so, the electronic device 100, or a communicatively coupled computing device, may identify voice commands issued by a user, for instance.

The light ring 114 may be disposed at/in the top 102 of the electronic device 100 and may provide a visual indicator corresponding to one or more states of the electronic device 100 (e.g., listening, receiving instruction, processing, etc.). In some instances, the light ring 114 may be disposed interior to the top cover 108 and/or may surround or encircle the shroud 116, so as to be interposed between the top cover 108 and the shroud 116. In some instances, a gap distance may separate the light ring 114 and the shroud 116.

Light sources, such as LEDs residing within the electronic device 100 may illuminate the light ring 114. In some instances, the light sources illuminating the light ring 114 may be illuminated statically (e.g., one or more of the light sources illuminated continuously) or dynamically (e.g., one or more of the light sources flashing simultaneously, illuminating one or more of the light sources sequentially, alternating which light sources are illuminated, etc.). Accordingly, the light ring 114 may take a wide range of visual appearances by varying which light sources are on/off, the respective colors of the light sources, and the timing of activating the light sources.

The electronic device 100 may also include a light diffuser disposed beneath the light ring 114 (Y-direction) that diffuses light generated by the LEDs. In doing so, the light diffuser may assist in eliminating "hot spots" or "bright spots" throughout the light ring 114. Additional details of the light diffuser are discussed herein with regard to FIGS. 10, 11A, and 11B.

As shown in FIG. 1, the exterior surface 106 of the electronic device 100 may be cylindrical or substantially cylindrical-shaped. However, in some instances, the exterior surface 106 may be shaped differently, such as being hexagonal, spherical, rectangular, and/or any combination thereof. The exterior surface 106 may be a smooth, uniform, or continuous surface to give the electronic device 100 an aesthetic appearance. As discussed in detail herein, the electronic device 100 may include a grill that provides the exterior surface 106. In some instances, the grill may be interchangeable to provide the electronic device 100 with varying, or customizable, appearances.

One or more openings 118 may be located proximate to the bottom 104 of the electronic device 100. For instance, a first opening may be located at or on the front of the electronic device 100, disposed in a first direction, while a second opening may be located at or on a back (spaced apart in the Z-direction from the front) of the electronic device 100, disposed in a second direction. A channel may span between the first opening and the second opening, through the electronic device 100.

The one or more openings 118 and/or the channel may radially disperse sound generated by one or more loudspeakers of the electronic device 100. As shown, the one or more openings 118 may angularly span around at least a portion, perimeter, or circumference, of the electronic device 100. Moreover, the one or more openings 118 may provide visual access to the one or more loudspeakers of the electronic device 100, such as a diaphragm, to allow a user to see the one or more loudspeakers firing.

Figure 2A:
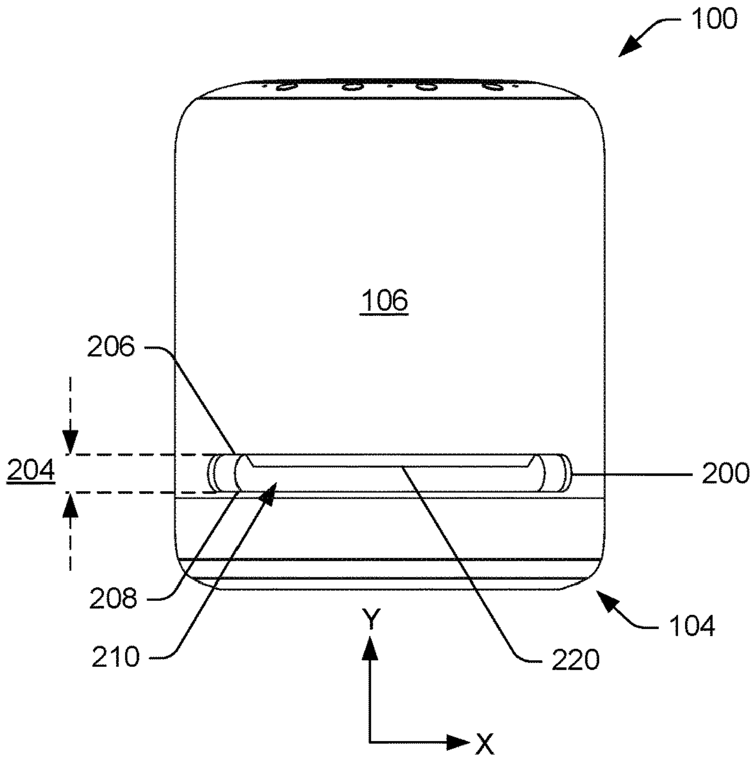
FIG. 2A is a front view of the example electronic device of FIG. 1, according to an embodiment of the present disclosure.
Figure 2B:
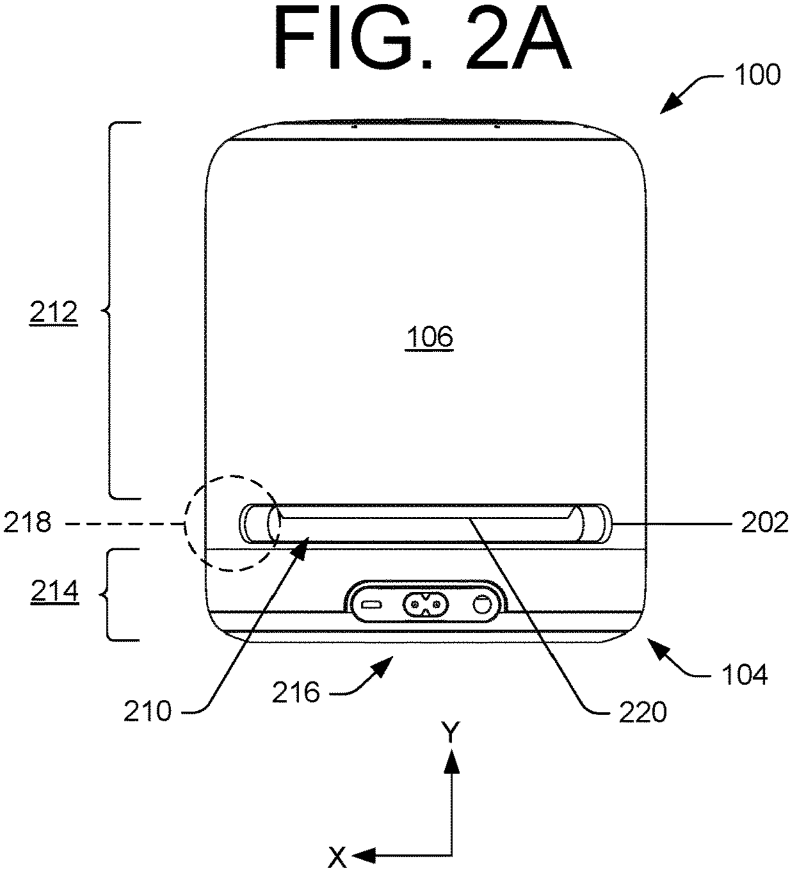
FIG. 2B is a back view of the example electronic device of FIG. 1, according to an embodiment of the present disclosure.

FIGS. 2A and 2B illustrate a front view and a back view of the electronic device 100, respectively. As discussed above with regard to FIG. 1, the electronic device 100 may include the one or more openings 118 located proximate to the bottom 104 of the electronic device 100. Shown in FIGS. 2A and 2B, the one or more openings 118 may extend through the electronic device 100, between opposing sides (or surfaces) on the exterior surface 106, to assist in outputting sound emitted by one or more loudspeakers. For instance, the one or more openings 118 may comprise a first opening 200 (FIG. 2A) located on the exterior surface 106 on the front of the electronic device 100, and a second opening 202 (FIG. 2B) located on the exterior surface 106 on the back of the electronic device 100.

In some instances, the first opening 200 and the second opening may be ovular-shaped and may partially extend around a perimeter or periphery of the exterior surface 106 of the electronic device 100. The first opening 200 and/or the second opening 202 may also include a height 204, which may represent a gap distance between a top 206 of the first opening 200 and/or the second opening 202 and a bottom 208 of the first opening 200 and/or the second opening 202, respectively. Additionally, shown in FIGS. 2A and 2B, a cavity, gap, opening, or channel 210 may extend through the electronic device 100 (Z-direction), between the first opening 200 and the second opening 202, to permit a user to look through the electronic device 100. As discussed in detail herein with regard to FIGS. 16, 17A, 17B, 19, and 20, in some instances the channel 210 may be formed at least in part by a bottom loudspeaker port. For instance, the bottom loudspeaker port may include features or a structure that forms the channel 210 and/or provides the first opening 200 and/or the second opening 202. The channel 210 may also assist in directing sound outward and away from the electronic device 100.

The electronic device 100 may include a top portion 212 and a bottom portion 214. The top portion 212 may include one or more loudspeakers, for instance, while the bottom portion 214 may include computing components and/or input/output ports, such as a power port. For instance, as shown in FIG. 2B, the bottom portion 214 may include one or more ports 216 located on the back of the electronic device 100. In some instances, the one or more ports 216 may comprise a power port for powering the electronic device 100, audio jacks, and/or a USB port. However, the electronic device 100 may additionally, or alternatively, include other ports. Moreover, in some instances, the electronic device 100 may include a rechargeable battery for cordless operation.

The electronic device 100 may include one or more legs, posts, or columns 218 extending between the top portion 212 of the electronic device 100 and the bottom portion 214 of the electronic device 100. The columns 218 may be located at or along sides of the electronic device 100. In some instances, a height of the columns 218 (Y-direction) may correspond to the height 204 of the first opening 200 and the second opening 202. As noted above, being as the mains power may be received at or within the bottom portion 214 of the electronic device 100, power, and/or other wires, may route through the columns 218 to communicatively couple components residing within the bottom portion 214 to components residing within the top portion 212, vice versa. That is, power received at the bottom portion 214, via the port(s) 216, may be routed to the top portion 212 via the columns 218. Additionally, in some instances, the columns 218 may provide a channel to house one or more electrical and/or optical connections. However, in some instances, the electronic device 100 may be capable of wirelessly transmitting power and/or signals between components within the top portion 212 and components within the bottom portion 214.

In some instances, the electronic device 100 may include two columns, where a first column is interposed between the first opening 200 and the second opening 202 on a first side of the electronic device 100, while a second column is interposed between the first opening 200 and the second opening 202 on a second side of the electronic device 100. In other words, the columns 218 may separate or be disposed between the first opening 200 and the second opening 202. Discussed herein within regard to FIGS. 17B and 20, the columns 218, or a space through which power and/or other wires may route, may be formed at least in part by the bottom loudspeaker port.

The top portion 212 may include loudspeakers of the electronic device 100, such as a loudspeaker 220. The loudspeaker 220 may comprise a woofer loudspeaker oriented towards the bottom 104 of the electronic device 100. The one or more openings 118 of the electronic device 100 and/or the channel 210 may permit a user to see the loudspeaker 220. For instance, the loudspeaker 220 may be configured to fire towards the bottom 104 of the electronic device 100 such that the user may see a diaphragm of the loudspeaker 220 moving up and down (Y-direction). The height 204 of the one or more openings 118 may be sufficient such that when the loudspeaker 220 fires, the diaphragm of the loudspeaker 220 does not contact the bottom 208 of the one or more openings 118. Additionally, when fully extended (at its maximum excursion), an air gap may separate the diaphragm of the loudspeaker 220 and the bottom 208. The air gap may maintain a quality of audio output from the loudspeaker 220 through not compressing air interposed between the diaphragm at its maximum excursion and the bottom 208. In some instances, the air gap may between about two millimeters and about three millimeters, while the height 204 may be at least fourteen millimeters.

Figure 3:
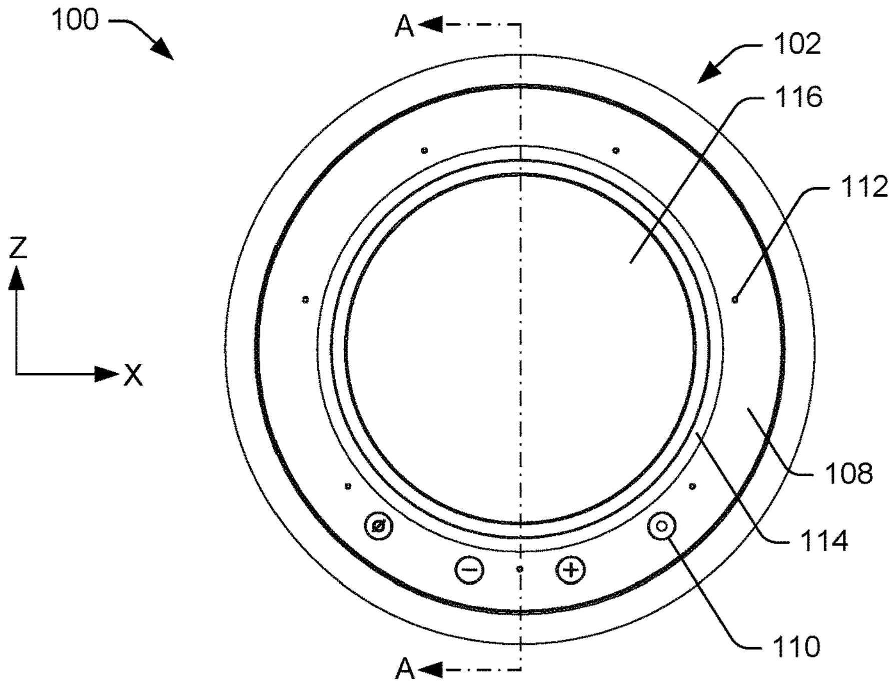
FIG. 3 is a top view of the example electronic device of FIG. 1, according to an embodiment of the present disclosure.

FIG. 3 illustrates a top view of the electronic device 100, showing the buttons 110, the microphone ports 112, the light ring 114, and the shroud 116 arranged on the top 102 of the electronic device 100.

The buttons 110 may be arranged or aligned along an axis or arc that mirrors the exterior surface 106 of the electronic device 100, such that the buttons 110 curve and/or follow a trajectory of the exterior surface 106. That is, the buttons 110 may be spaced apart from one another on the top cover 108 along an arc that follows a particular path at a certain offset from the exterior surface 106. As shown, and in some instances, the buttons 110 may have symbols that visually indicate their associated function. While the electronic device 100 is shown including a certain number of buttons 110, the electronic device 100 may include more than or less four buttons 110.

The microphone ports 112 may substantially and/or equidistantly encircle the top 102 of the electronic device 100 (e.g., resembling a ring), about a central longitudinal axis of the electronic device 100, and may be disposed through the top cover 108. In some instances, the electronic device 100 may include seven microphone ports 112, and correspondingly, seven microphones. Individual microphones may be located beneath (Y-direction) respective microphone ports 112. However, the electronic device 100 may include more than or less than seven microphone ports 112 and/or more than seven microphones, respectively. Accordingly, the microphone ports 112 may direct sound or allow sound to reach the microphones within the electronic device 100.

Figure 4:
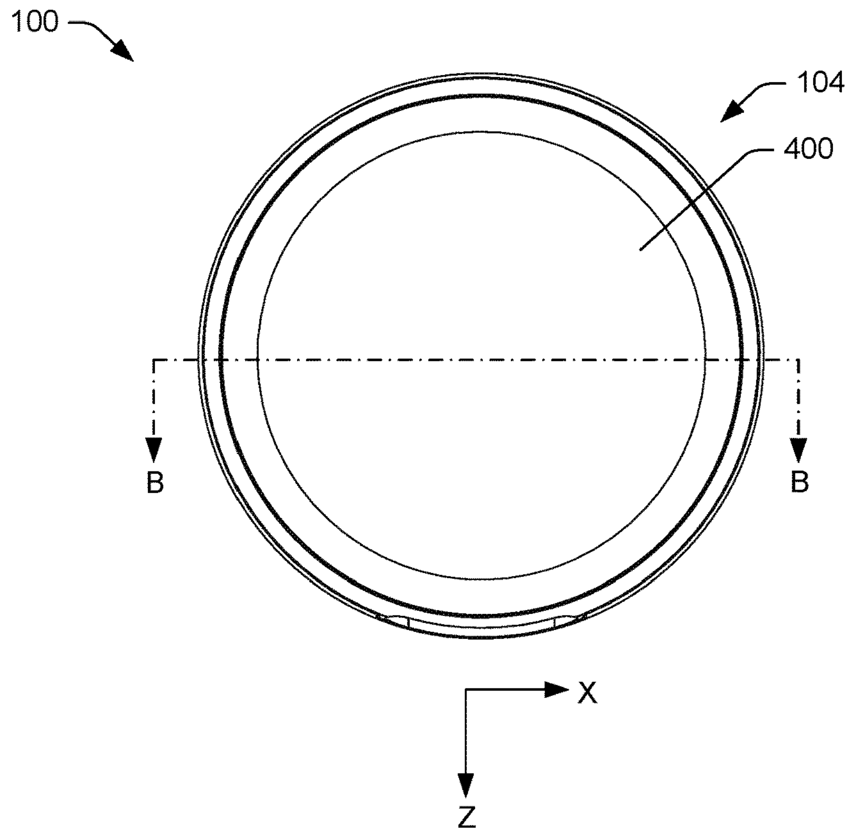
FIG. 4 is a bottom view of the example electronic device of FIG. 1, according to an embodiment of the present disclosure.

FIG. 4 illustrates a bottom view of the electronic device 100. In some instances, the bottom 104 of the electronic device 100 may include a pad 400 made of rubber, for instance, that secures the electronic device 100 within an environment, such as on a desk, counter, shelf, etc. The pad 400 may also dampen and/or absorb vibrations of the electronic device 100 (e.g., from the loudspeakers) and/or may prevent the electronic device 100 from rattling during use.

Figure 5:
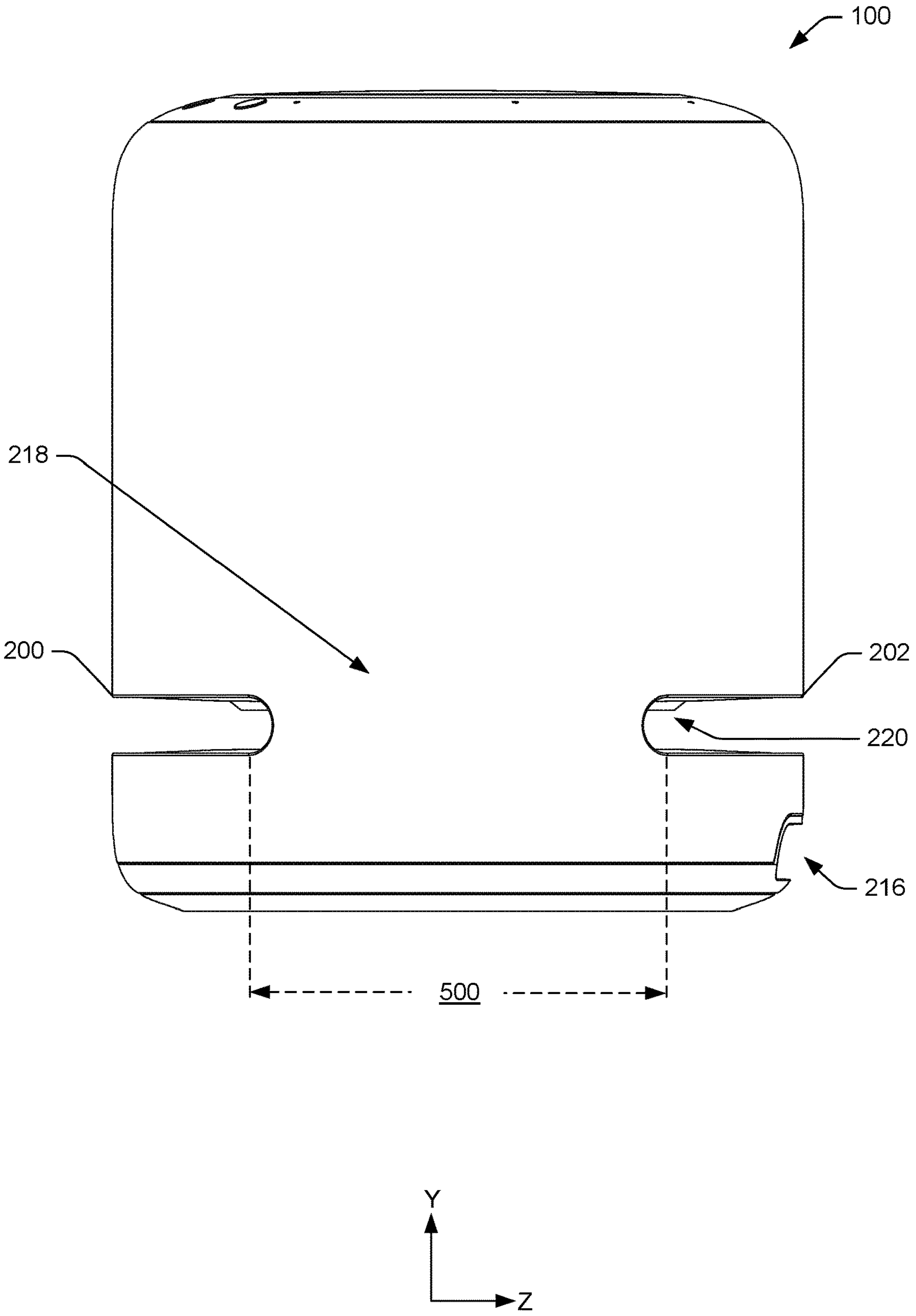
FIG. 5 is a side view of the example electronic device of FIG. 1, according to an embodiment of the present disclosure.

FIG. 5 illustrates a side view of the electronic device 100. As shown, the electronic device 100 includes the first opening 200 disposed on/in a front of the electronic device 100 and the second opening 202 disposed on/in a back of the electronic device 100, spaced apart in the Z-direction from the front of the electronic device 100. As discussed above, the first opening 200 and the second opening 202 may correspond to, or represent, the one or more openings 118 of the electronic device 100.

Interposed between the first opening 200 and the second opening 202, on adjacent lateral sides of the electronic device 100, may be the columns 218. The columns 218 may have a width 500 that extends between a first end (or side) of the first opening 200 and a first end (or side) of the second opening 202, and between a second end (or side) of the first opening 200 and a second end (or side) of the second opening 202, respectively. Additionally, as noted above, the columns 218 may extend between the top portion 212 and the bottom portion 214 of the electronic device 100 and wires, optical fibers, or other electrical connections, may be housed within the columns 218, or may extend through the columns 218, along sides of the electronic device 100 to maintain an aesthetic appearance of the electronic device 100. However, in some instances, the electronic device 100 may be capable of wirelessly transmitting power and/or signals between components within the top portion 212 and components within the bottom portion 214.

As shown in FIG. 5, a portion of the loudspeaker 220, such as a diaphragm, may be visible from the side of the electronic device 100.

Figure 6:
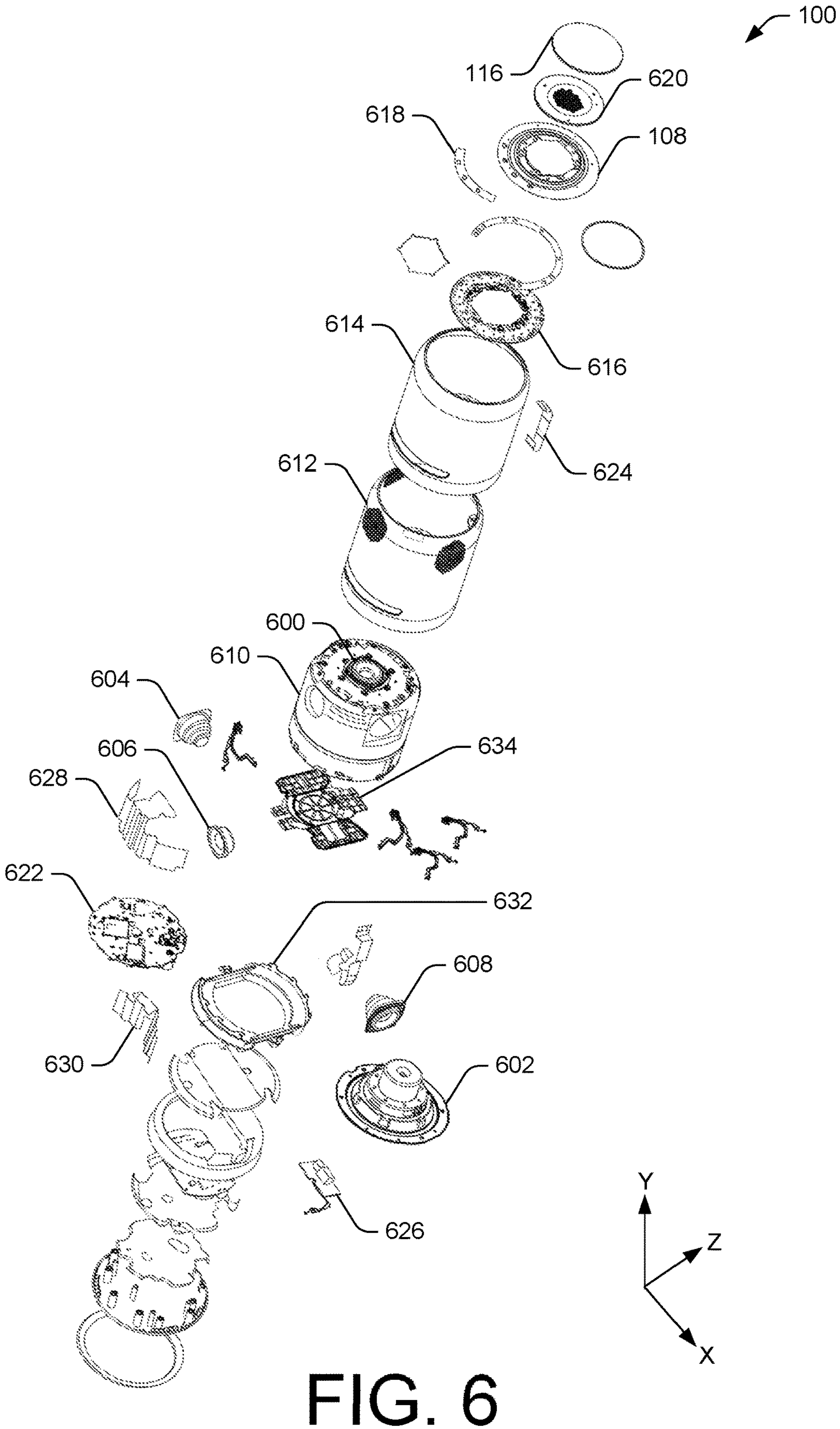
FIG. 6 is an exploded view of the example electronic device of FIG. 1, showing example components of the example electronic device, according to an embodiment of the present disclosure.

FIG. 6 illustrates a partial exploded view of the electronic device 100, showing example components of the electronic device 100. Once assembled, for instance, as shown in FIG. 1, the electronic device 100 may resemble a compact enclosure, potentially minimizing a size of the electronic device 100. That is, in some instances, the components of the electronic device 100 may compactly couple together such that little space exists within an interior of the electronic device 100.

The electronic device 100 includes one or more loudspeakers (e.g., woofer, mid-range, full-range, and/or tweeter). For instance, the electronic device 100 may include a first loudspeaker 600, a second loudspeaker 602, which may correspond to and/or represent the loudspeaker 220, a third loudspeaker 604, a fourth loudspeaker 606, and a fifth loudspeaker 608. In some instances, the first loudspeaker 600 may correspond to a mid-range loudspeaker, the second loudspeaker 602 may correspond to a woofer loudspeaker, the third loudspeaker 604 may correspond to a mid-range loudspeaker, the fourth loudspeaker 606 may correspond to a tweeter loudspeaker, and the fifth loudspeaker 608 may correspond to a mid-range loudspeaker.

The loudspeakers may couple to a housing or cabinet 610 of the electronic device 100, which may reside within an interior of the electronic device 100. The cabinet 610 may include one or more ports, or openings, through which the loudspeakers reside, respectively. When coupled to the cabinet 610, the loudspeakers may project sound outward and away from the electronic device 100. The loudspeakers may be arranged on the electronic device 100, or on the cabinet 610, to provide a stereo or surround-sound effect when sound is output from the loudspeakers. For instance, the first loudspeaker 600 may couple to a top of the cabinet 610 and may be oriented toward the top 102 of the electronic device 100, the second loudspeaker 602 may be located at a bottom of the cabinet 610 and may be oriented toward the bottom 104 of the electronic device 100, the third loudspeaker 604 may be coupled to a side of the cabinet 610, the fourth loudspeaker 606 may be coupled to a front of the cabinet 610, and the fifth loudspeaker 608 may be coupled to a side of the cabinet 610, at a position diametrically opposed to the third loudspeaker 604. In some instances, the fourth loudspeaker 606 may be disposed between the third loudspeaker 604 and the fifth loudspeaker 608.

The electronic device 100 may include a sleeve 612 and a grill 614. As will be discussed herein with regard to FIGS. 14, 15A, and 15B, the sleeve 612 and/or the grill 614 may couple to the cabinet 610, and when coupled, the sleeve 612 and/or the grill 614 may at least partially provide the exterior surface of the electronic device 100 (e.g., the exterior surface 106). The sleeve 612 may include openings that partially or completely extend through a thickness of the sleeve 612 and which are disposed adjacent to one or more of the loudspeakers. As such, the openings may be located next to one or more of the loudspeakers to disperse sound away from the electronic device 100.

The electronic device 100 may include a first printed circuit board (PCB) 616 that resides beneath the top cover 108 (Y-direction) and may include computing components such as one or more processors, memory, circuits, transformers, LEDs, and so forth. The first PCB 616 may receive inputs from the buttons 110 and/or microphones of the electronic device 100. In some instances, the microphones may be mounted or otherwise connected to the first PCB 616. As discussed hereinabove, to permit acoustic signals to reach the microphone(s), the microphone(s) may be aligned or disposed beneath microphone ports 112 extending through the top cover 108. A foam substrate or other sound isolation substrates may also be included to acoustically insulate the microphones and/or the microphone ports 112.

The first PCB 616 may include one or more LEDs or other light sources configured and designed to emit light towards the light ring 114 and/or a light diffuser of the electronic device 100. The LEDs may be located about a central longitudinal axis of the electronic device 100 and may be substantially equidistantly spaced about the central longitudinal axis. In some instances, the LEDs on the first PCB 616 may be top firing such that light emitted by the LEDs is directed toward the top 102 of the electronic device 100 (Y-direction). Additional details of the light diffuser 1000 are discussed in FIGS. 11A and 11B.

The top cover 108 may include one or more holes through which the buttons 110 extend. A button mount 618 may reside beneath the top cover 108 and may have receptacles or openings that align with the one or more holes disposed through the top cover 108. The button mount 618 may assist in providing a mechanical stroke and/or action to the buttons 110, such as giving the buttons 110 tactility and mechanical action, enabling the buttons 110 to be depressed and returned to a resting state.

As will be discussed herein with regard to FIGS. 8 and 9, the shroud 116 and a top loudspeaker port 620 may couple to the top cover 108 and/or the cabinet 610. The top loudspeaker port 620 may include holes, and when the top loudspeaker port 620 couples to the top cover 108, are disposed adjacent to (e.g., above) the first loudspeaker 600 to radially disperse sound away from the electronic device 100. Further, the shroud 116 may visually conceal the holes in the top loudspeaker port 620.

The electronic device 100 may include a second PCB 622 to carry out and perform functions of the electronic device 100. For instance, the second PCB 622 may provide signals to one or more of the loudspeakers of the electronic device 100. The second PCB 622 may include any number of processors, memory, circuits, transformers, power supplies, and so forth. In some instances, the second PCB 622 may comprise a multilayer PCB. The second PCB may also include network interfaces and/or transceivers configured for communication with other devices, such as mobile phones, tablets, computers, other portable audio input/output devices, and/or any other computing device capable of communication. For instance, the second PCB 622 may include ZigBee interfaces, Bluetooth interfaces, Bluetooth Low Energy (BLE) interfaces, Wi-Fi interfaces, adaptive frequency technology (AFT) interfaces, or the like. In some instances, the second PCB 622 may include multiple Wi-Fi interfaces to reduce latency in transmissions between the electronic device 100 and/or one or more communicatively coupled computing devices. Additionally, in some instances, antennas for the ZigBee and/or Bluetooth interfaces may be located proximate to the top 102 of the electronic device 100 and may be coupled to a sidewall of the cabinet 610. In some instances, the positioning of the antennas proximate to the top 102 of the electronic device 100 may increase received signal strength of data and/or provide increased connections when communicatively coupled to computing devices. Antennas of the Wi-Fi interfaces may be located on the second PCB 622.

The electronic device 100 and/or the second PCB 622 may include shielding plates and/or isolating foams may to guard against incoming or outgoing emissions of electromagnetic frequencies of the electronic device 100.

A connector 624 may communicatively couple the first PCB 616 and the second PCB 622. As an example, the connector 624 may allow for signals to be sent from the second PCB 622 to illuminate the LEDS of the first PCB 616 according to an operational state of the electronic device 100. In addition, the connector 624 may provide power to the microphones, LEDs, the first PCB 616, and so forth.

The electronic device 100 may include a port assembly 626 that includes input/output jacks, a power connector, and a USB port, for instance. In some instances, the port assembly 626 may include a microphone configured to capture sound generated by the fifth loudspeaker 608.

The electronic device 100 may include heat dissipating elements 628, 630 to dissipate heat generated by one or more components. For instance, the processor(s), camera(s), power supply, and network interfaces of the first PCB 616 and/or the second PCB 622 may generate heat during use. To efficiently dissipate heat generated by the components, the heat dissipating elements 628, 630 may couple to the cabinet 610 (such as an interior surface or sidewall) to transmit heat away from sources within the electronic device 100 toward an exterior of the electronic device 100 and/or to uniformly distribute the heat over the surface area of the electronic device 100. Accordingly, the heat dissipating elements 628, 630 may help prevent the electronic device 100 from overheating.

The electronic device 100 may include frames or mounts sized and configured to be reside within the electronic device 100, such as within the cabinet 610 and/or the sleeve 612. The frames and/or mounts may support components within the electronic device 100 or the components may otherwise attach to the frames and/or mounts for coupling to the electronic device 100. For instance, the electronic device 100 may include a bottom loudspeaker port 632 that supports the second loudspeaker 602 within the electronic device 100. In some instances, the bottom loudspeaker port 632 may couple to the cabinet 610. Additionally, components residing within the bottom portion 214 of the electronic device 100 may couple to the bottom loudspeaker port 632. The frames and/or mounts may communicatively, electrically, and/or thermally couple or link one or more components of the electronic device 100 to one another.

As will be discussed with regard to FIG. 13, the cabinet 610 may include chambers or other cavities to provide separate back volumes to one or more loudspeakers of the electronic device 100, such as the mid-range loudspeakers (e.g., the first loudspeaker 600, the third loudspeaker 604, the fifth loudspeaker 608). To seal one or more sides of the cavities, the electronic device 100 may include a seal cap 634. In some instances, the seal cap 634 may comprise a double shot thermoplastic elastomer (TPE) that couples to the cabinet 610 to seal one or more sides of the cavities that provide the back volumes to the mid-range loudspeakers. In some instances, the seal cap 634 may comprise a three-dimensional (3D) seal that seals in multiple directions (i.e., X-direction, Y-direction, and Z-direction). For instance, conventional seals may limit sealing in two dimensions, which may fail to provide an air-tight, or substantially air-tight seal, for the cavities in which the loudspeakers reside. In other words, conventional seals may be flat. However, using a 3D seal, such as the seal cap 634, an air-tight seal may be provided to the cavities of the cabinet 610. In doing so, an audio performance of the mid-range loudspeakers may be increased. A 3D seal may also minimize a size of the electronic device 100, as the seal cap 634 may effectively seal the cavities in multiple directions without sacrificing a footprint of the electronic device 100.

As noted above, the first PCB 616 and/or the second PCB 622 may include memory. When present, the memory may store one or more software components or instructions that, when executed by one or more processors, configure the electronic device 100 to perform various operations. For instance, the electronic device 100 may be configured to capture and respond to user speech and to carry out speech processing, such as automatic speech recognition (ASR) or natural language understanding (NLU), speech synthesis may be performed by the components of the electronic device 100. By way of illustration, a user may verbally request the electronic device 100 (or another communicatively coupled computing device) to perform a particular task, such as to play music. The electronic device 100 may process the user command and cause one or more operations to be performed, such as playing the requested music over one or more loudspeakers of the electronic device 100 (e.g., the first loudspeaker 600, the second loudspeaker 602, and so forth). In some instances, to accomplish the operations performable by the electronic device 100, the components may be used in conjunction with network-based support services.

Figure 7B:
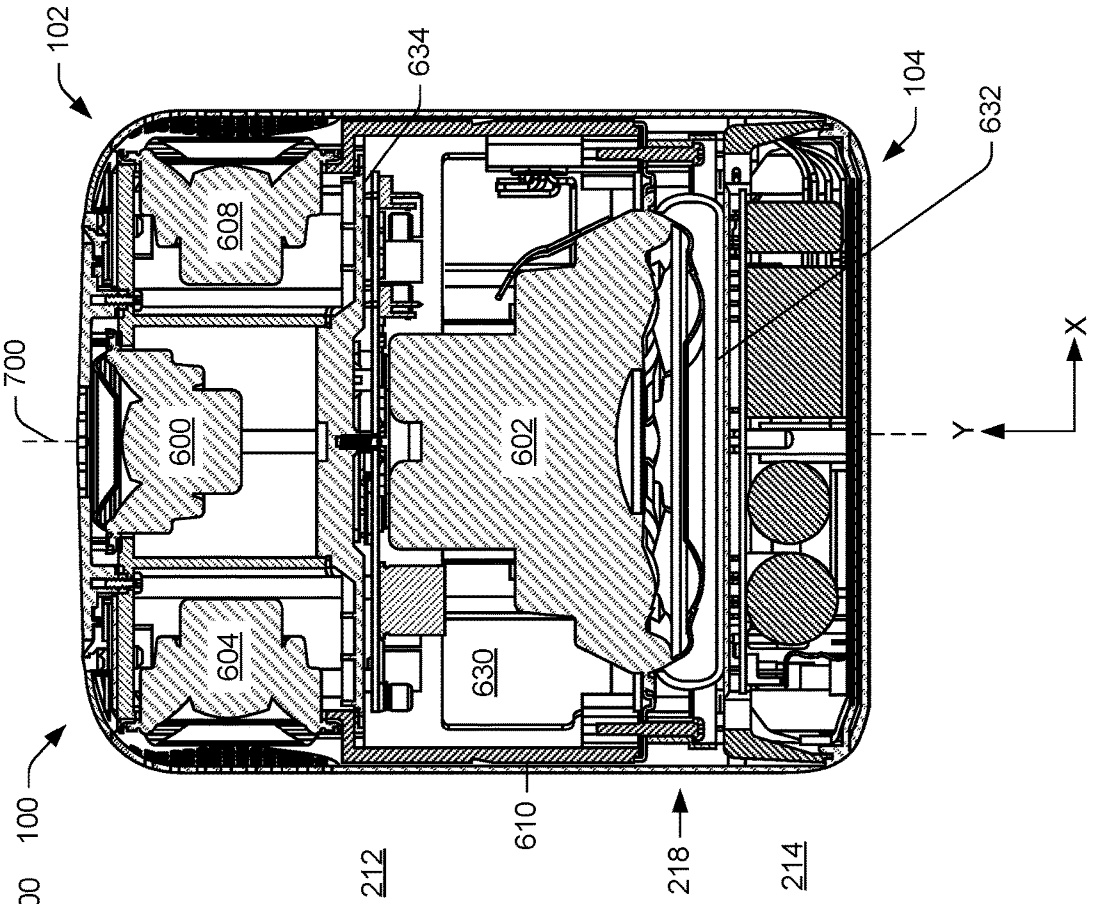
FIG. 7B is a second cross-sectional view of the example electronic device of FIG. 1 taken along line B-B in FIG. 4, according to an embodiment of the present disclosure.
Figure 7A:
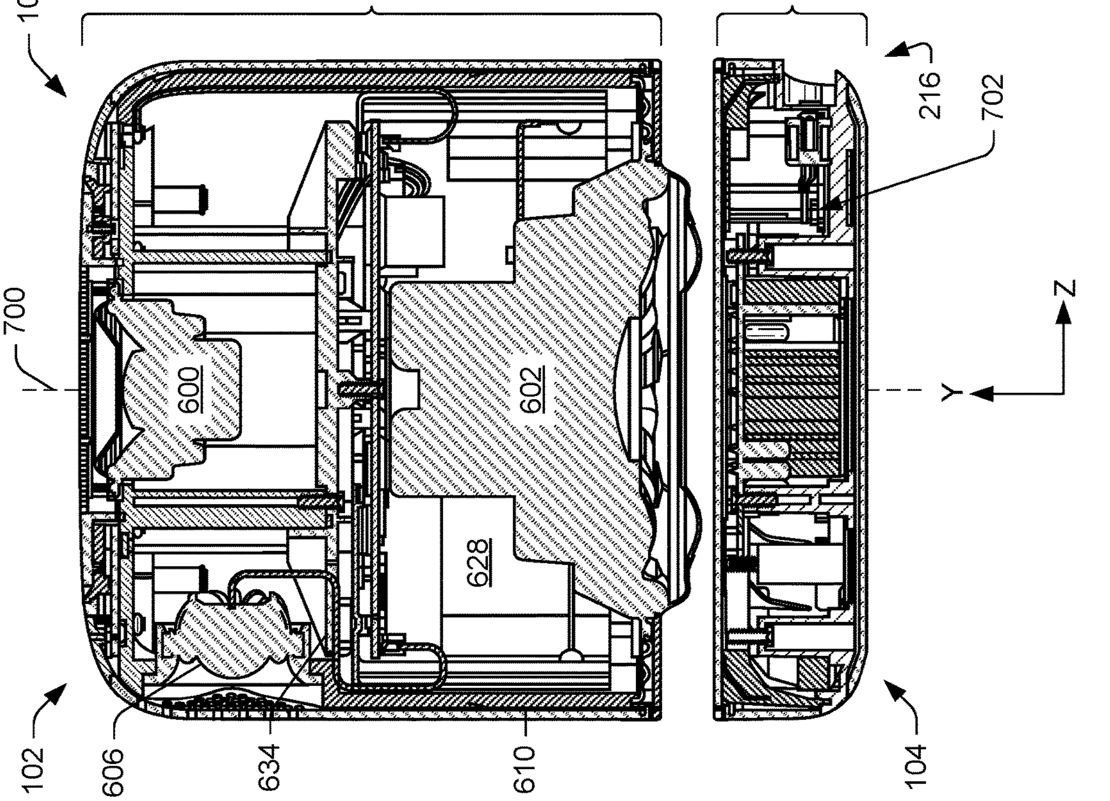
FIG. 7A is a first cross-sectional view of the example electronic device of FIG. 1 taken along line A-A in FIG. 3, according to an embodiment of the present disclosure.

FIGS. 7A and 7B illustrate cross-sectional views of the electronic device 100. More particularly, FIG. 7A illustrates a cross-sectional view of the electronic device 100 taken through a central longitudinal axis 700 of the electronic device 100 along a Y-Z plane, while FIG. 7B illustrates a cross-sectional view of the electronic device 100 taken through the central longitudinal axis 700 of the electronic device 100 along a X-Y plane.

The first loudspeaker 600, the second loudspeaker 602, the third loudspeaker 604, the fourth loudspeaker 606, and the fifth loudspeaker 608 may be arranged in the cabinet 610 to output audio in different directions relative to electronic device 100 to achieve improved audio characteristics and/or provide stereo or surround-sound effect. For instance, the third loudspeaker 604, the fourth loudspeaker 606, and the fifth loudspeaker 608 may be arranged around the central longitudinal axis 700 of the electronic device 100 and/or about the first loudspeaker 600 and/or the second loudspeaker 602. In some instances, the first loudspeaker 600 may fire in a first direction (Y-direction), the second loudspeaker 602 may fire in a second direction (Y-direction) that is opposite to the first direction, the third loudspeaker 604 may fire in a third direction (X-direction), the fourth loudspeaker 606 may fire in a fourth direction (Z-direction), and the fifth loudspeaker 608 may fire in a fifth direction (X-direction) that is opposite to the third direction.

In some instances, the first loudspeaker 600 and the second loudspeaker 602 may be centrally aligned within the electronic device 100. That is, a centerline of the first loudspeaker 600 and a centerline of the second loudspeaker 602 may be aligned with the central longitudinal axis 700 of the electronic device 100. As noted above, the first loudspeaker 600 may comprise a mid-range loudspeaker, while the second loudspeaker 602 may comprise a woofer loudspeaker.

As shown in FIG. 7B, the third loudspeaker 604 and the fifth loudspeaker 608 may be located on opposite sides of the electronic device 100 (e.g., first side and second side, respectively), and in some instances, may be diametrically opposed to one another. The third loudspeaker 604 and/or the fifth loudspeaker 608 may comprise mid-range loudspeakers. In some instances, a centerline of the third loudspeaker 604 and a centerline of the fifth loudspeaker 608 may be oriented perpendicularly, or substantially perpendicularly, to the central longitudinal axis 700 of the electronic device 100. The third loudspeaker 604 and the fifth loudspeaker 608 may also be disposed on a same plane (X-Z).

As shown in FIG. 7A, the fourth loudspeaker 606 may be located on a front of the electronic device 100, opposite to the ports 216, which are located at the back of the electronic device 100. In some instances, the fourth loudspeaker 606 may comprise a tweeter loudspeaker and may be oriented perpendicularly, or substantially perpendicularly, to the central longitudinal axis 700 of the electronic device 100. In some instances, a centerline of the third loudspeaker 604, the fourth loudspeaker 606, and/or the fifth loudspeaker 608 may be disposed on a same plane (X-Z).

The electronic device 100 may include the top portion 212 and the bottom portion 214. The columns 218 may extend between the top portion 212 and the bottom portion 214. To communicatively couple the top portion 212 and the bottom portion 214, wires, connectors, or other components may route through, or be disposed within, the columns 218. For instance, as power is received via the ports 216, power may route through the columns 218 to components within the top portion 212, such as the first PCB 616 and/or the second PCB 622. In some instances, power may route through a first column of the columns 218, while other wires for control signaling may route through a second column of the columns 218.

As noted above, and as will be discussed herein with regard to FIGS. 17B and 20, in some instances the top portion 212 and the bottom portion 214 may be separated by the bottom loudspeaker port 632, which may at least partially provide the columns 218 through which the wires extend. The bottom loudspeaker port 632 may include structures and/or features that provide channels, passageways, or conduits to route wires or optical fibers between the top portion 212 and the bottom portion 214, vice versa. As such, the wires may be concealed via the columns 218 to maintain an aesthetic appearance of the electronic device 100.

In some instances, the bottom portion 214 may also include one or more PCBs, LEDs, or microphones. For instance, the bottom portion 214 may include a microphone 702 located below (Y-direction) the second loudspeaker 602. The microphone 702 may be configured to receive sound output from the second loudspeaker 602. In some instances, the microphone 702 may be mounted to the port assembly 626. The bottom loudspeaker port 632 and/or more microphone ports within the bottom portion 214 may route sound output from the second loudspeaker 602 to the microphone 702. Audio captured by the microphone 702 may be used for acoustic echo cancellation (AEC) or active noise cancellation.

As shown in FIGS. 7A and 7B, the seal cap 634 may seal the respective cavities in which the first loudspeaker 600, the third loudspeaker 604, and the fifth loudspeaker 608 reside, respectively, so as to seal the respective back volumes. Additionally, as shown, and as discussed above, the seal cap 634 may be 3D, so as to seal in the X-direction (side-to-side of the electronic device 100), the Y-direction (top-to-bottom of electronic device 100), and also the Z-direction (front-to-back of the electronic device 100).

FIGS. 7A and 7B also illustrate the heat dissipating elements 628, 630 coupled to an interior surface of the cabinet 610 to disperse heat generated by one or more components of the electronic device 100.

Figure 8:
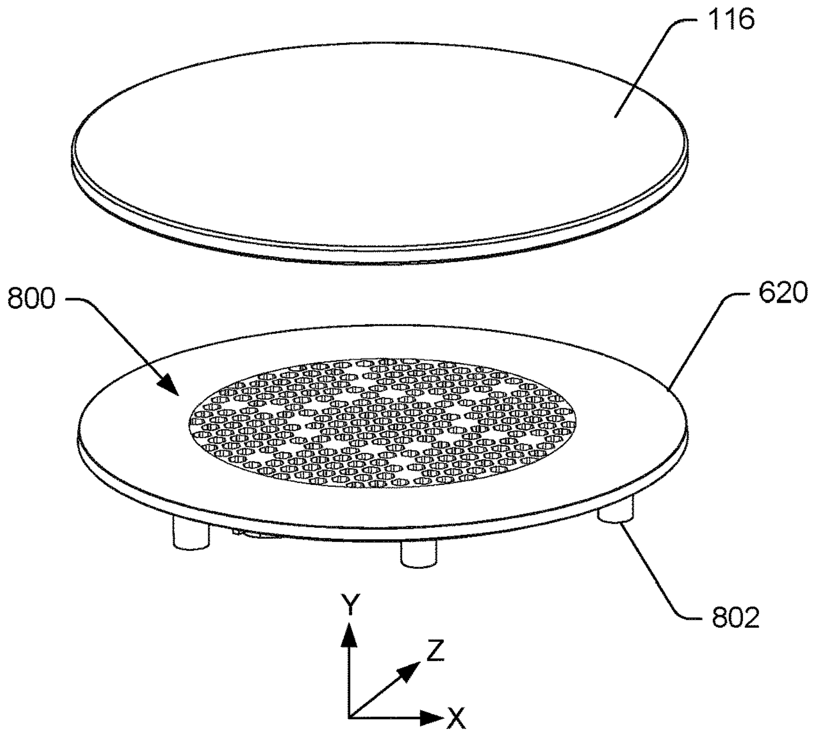
FIG. 8 illustrates an example shroud and an example top loudspeaker port for one or more loudspeakers of the example electronic device of FIG. 1, according to an embodiment of the present disclosure.

FIG. 8 illustrates the shroud 116 and the top loudspeaker port 620, showing the shroud 116 disposed above (Y-direction) the top loudspeaker port 620. As shown, the top loudspeaker port 620 may include holes 800 arranged around or proximal to a center of the top loudspeaker port 620. When coupled to the electronic device 100, such as the top cover 108 or the cabinet 610, the holes 800 may be disposed adjacent to (e.g., above) the first loudspeaker 600. Accordingly, when the first loudspeaker 600 fires, the holes 800 may permit sound to pass through.

The shroud 116 may include loudspeaker grill cloth, acoustic fabric, acoustic cloth, grille cloth, and/or speaker mesh to prevent dust or other debris from collecting on the first loudspeaker 600 and to allow sound to pass therethrough. In some instances, the shroud 116 may couple to the top loudspeaker port 620 via mechanical fasteners, adhesives, press-fit, and so forth. The top loudspeaker port 620 may also include columns or other protrusions 802 that engage with corresponding receptacles on the top cover 108.

Figure 9:
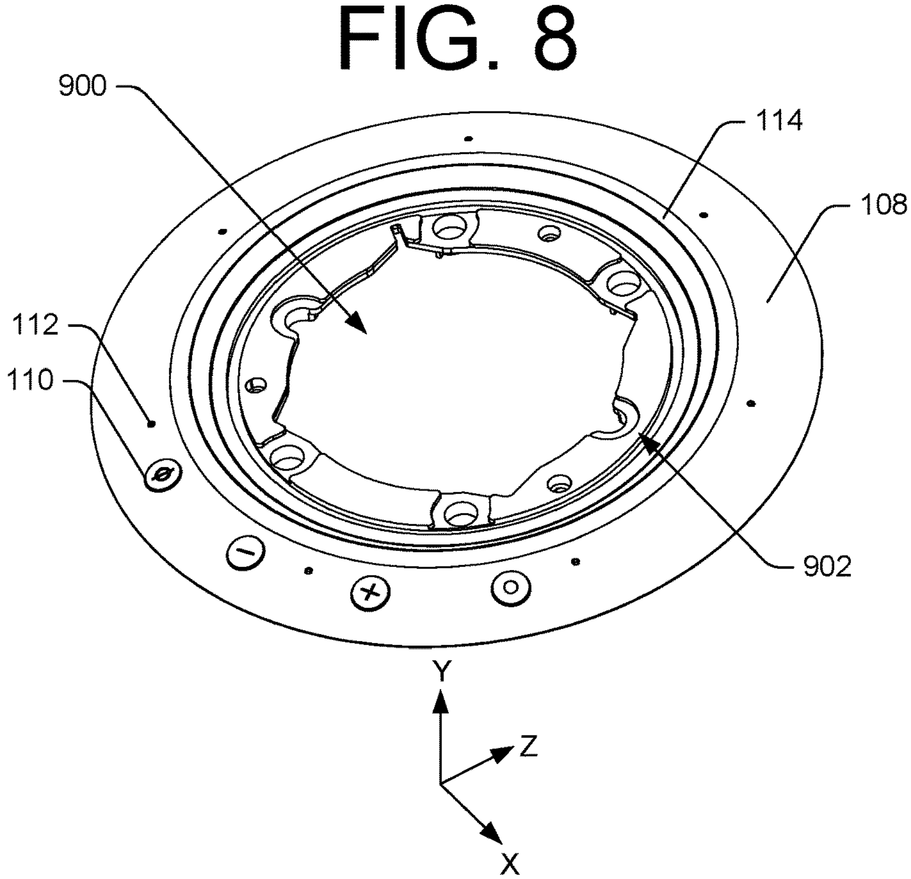
FIG. 9 illustrates an example top cover of the example electronic device of FIG. 1, according to an embodiment of the present disclosure.

FIG. 9 illustrates the top cover 108 of the electronic device 100. As discussed above, the top cover 108 may include the microphone ports 112 that extend through a thickness of the top cover 108 such that sound external to the electronic device 100 may reach the microphones within the cabinet 610, for instance. FIG. 9 further illustrates the buttons 110 disposed through the top cover 108 and the light ring 114 disposed interior to the buttons 110.

The top cover 108 may include an opening 900 sized and configured to receive the first loudspeaker 600. That is, when the top cover 108 couples to the cabinet 610, the first loudspeaker 600 may extended into, through, or partially through the opening 900.

The top cover 108 may include one or more receptacles 902 to receive the one or more protrusions 802 on the top loudspeaker port 620 to secure or couple the top loudspeaker port 620 and/or the shroud 116 to the electronic device 100.

Figure 10:
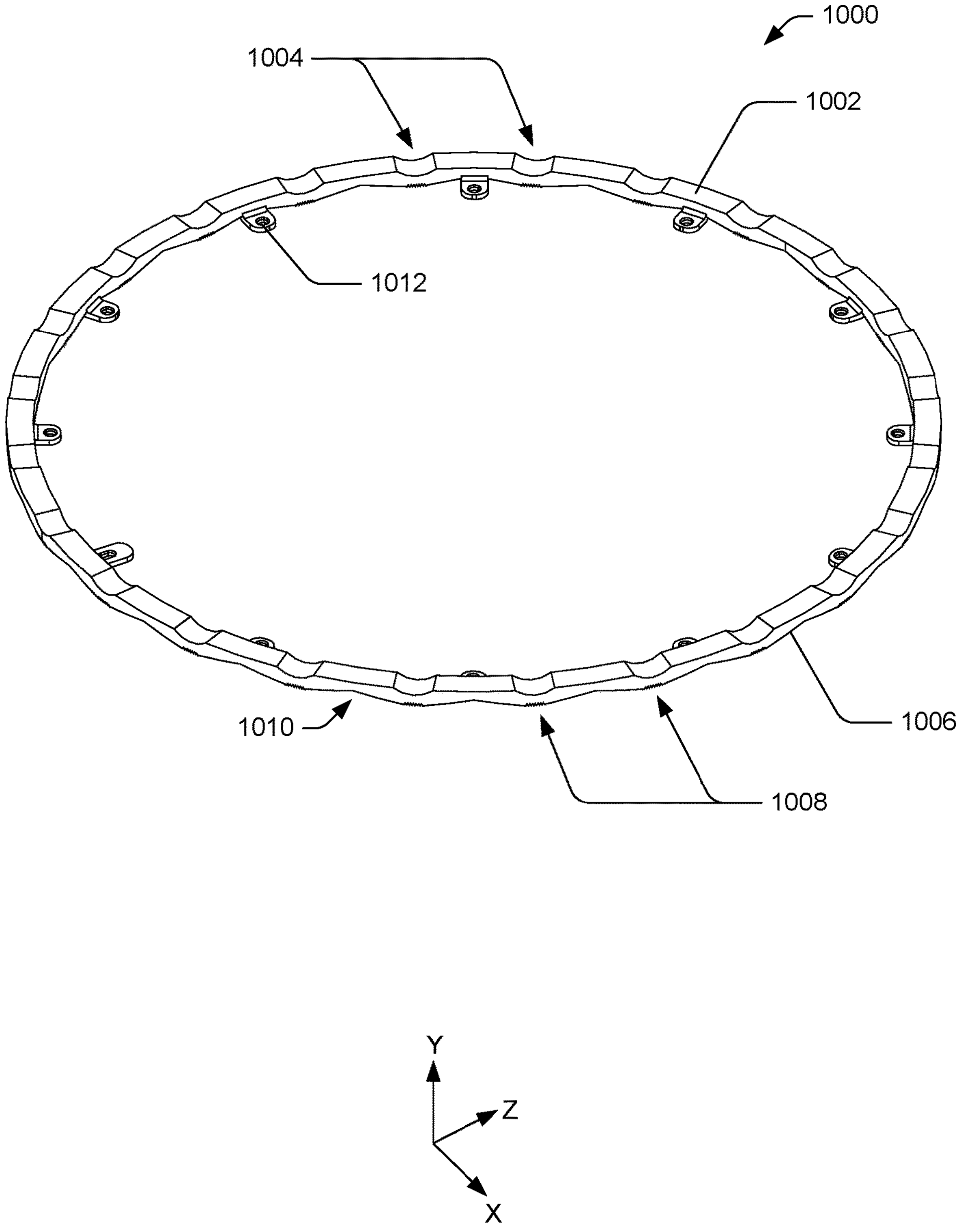
FIG. 10 is a perspective view of an example light diffuser of the example electronic device of FIG. 1, according to an embodiment of the present disclosure.

FIG. 10 illustrates a perspective view of a light diffuser 1000. The light diffuser 1000 may be positioned at the top 102 of the electronic device 100 beneath the light ring 114 (Y-direction). In some instances, the light diffuser 1000 may couple to the light ring 114, vice versa, using a positionable mounting adhesive (PMA). The light diffuser 1000, in conjunction with the light ring 114, may indicate various information to a user, such as providing visual feedback regarding a task or operation being performed by the electronic device 100.

In some instances, the light diffuser 1000 may be circular in shape, may generally comprise a circular ring, and may comprise a milky or translucent material, such as polycarbonate. Additionally, in some instances, the light diffuser 1000 may include similar dimensions (e.g., thickness, height, width) as the light ring 114.

As discussed above, the light ring 114 may be illuminated by one or more light sources, such as LEDs, located within the electronic device 100 (e.g., on the first PCB 616) and the light diffuser 1000 may redirect light from the LEDs towards the light ring 114. In other words, light from the LEDs may be emitted towards the light diffuser 1000 and may bounce around, reflect, or refract within the light diffuser 1000 before being emitted towards the light ring 114.

The light diffuser 1000 may include features to eliminate, or substantially eliminate, "hot spots" or "bright spots" within the light ring 114. These features may spread or disperse the concentrated light energy from the LEDs throughout the light diffuser 1000 to uniformly disperse light towards the light ring 114. For instance, a top 1002 of the light diffuser 1000 may include pockets, notches, indentations, recessions, or other depressions 1004. A thickness (Y-direction) of the light diffuser 1000 may vary around the circumference of the light diffuser 1000, with portions being thinner than others. That is, the depressions 1004 may reduce a thickness of the light diffuser 1000 as compared to portions of the light diffuser 1000 not including the depressions 1004.

Individual depressions 1004 may be disposed above (Y-direction) one or more LEDs when the light diffuser 1000 couples to the top cover 108 and/or the cabinet 610. The depressions 1004 may assist in maximizing a total internal reflection within the light diffuser 1000 and through scattering light in X- and Z-directions, for instance.

FIG. 10 illustrates that the light diffuser 1000 may include twenty-four depressions 1004 spaced around the top 1002 of the light diffuser 1000. Correspondingly, in some instances, the electronic device 100, such as the first PCB 616, may include twenty-four corresponding LEDS. However, the light diffuser 1000 may include more than or less than twenty-four depressions and/or the electronic device 100 may include more than or less than twenty-four LEDs. The depressions 1004 may be substantially equidistantly spaced around the top 1002 of the light diffuser 1000. For instance, the depressions 1004 may be equidistantly spaced about a center of the light diffuser 1000.

Features on a bottom 1006 may also assist in uniformly dispersing light. For instance, the bottom 1006 of the light diffuser 1000 may include protrusions, spines, serrations, ridges, prisms, or ribs 1008. In some instances, the ribs 1008 may be vertically aligned (Y-direction), or reside beneath, the depressions 1004. As discussed in more detail herein, the ribs 1008 may be disposed directly adjacent to the LEDs positioned on the first PCB 616, for instance, when the light diffuser 1000 couples to the top cover 108 and/or the cabinet 610.

Additionally, as shown in FIG. 10, interposed between adjacent ribs 1008, on the bottom 1006, may be a peak 1010. The peak 1010 which may also assist in uniformly dispersing light generated by the LEDs.

The light ring 114 may include one or more attachments 1012 for coupling the light diffuser 1000 to the top cover 108 and/or the cabinet 610. In some instances, when coupled to the top cover 108, for instance, the LEDs on the first PCB 616 may be separated from the light diffuser 1000 by a distance of about, or substantially, one millimeter. That is, an air gap may be separate respective ribs 1008 and the respective LEDs residing adjacent (e.g., beneath) the ribs 1008. However, in some instances, a gap of about 0.5 millimeters to about 3 millimeters may be interposed between the light diffuser 1000 and the LEDs.

Figure 11A:
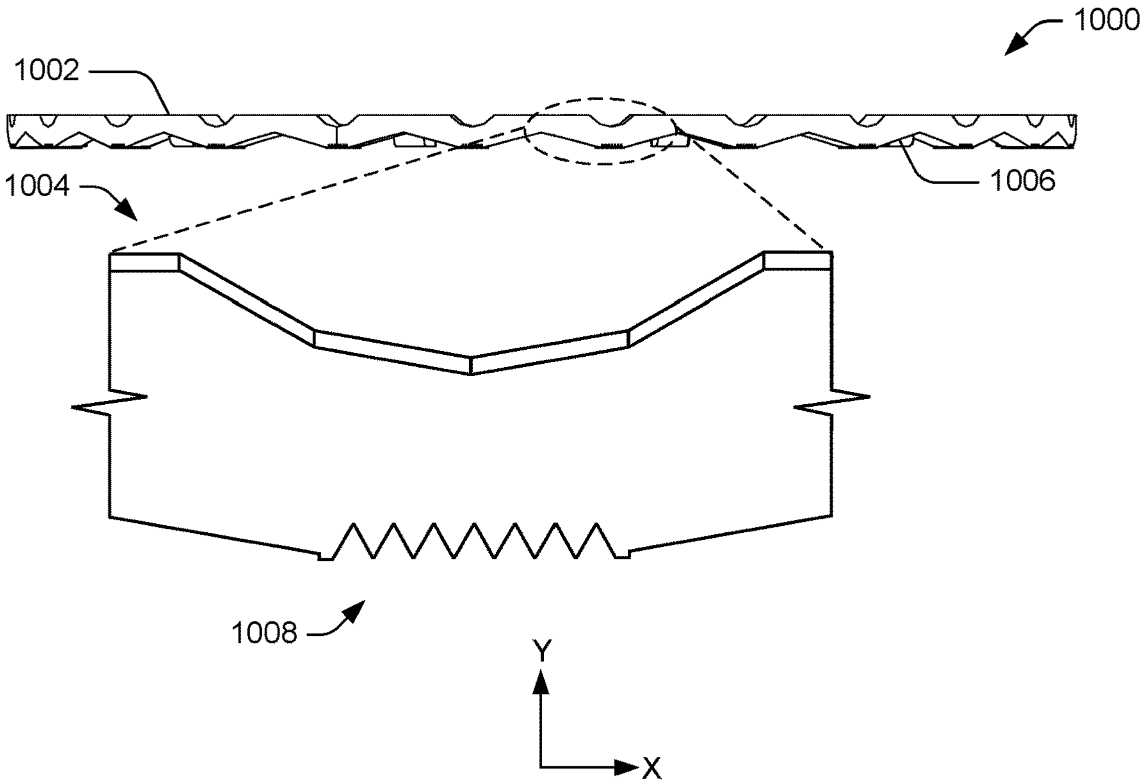
FIG. 11A is an enlarged detail view of a side of the example light diffuser of FIG. 10, according to an embodiment of the present disclosure.
Figure 11B:
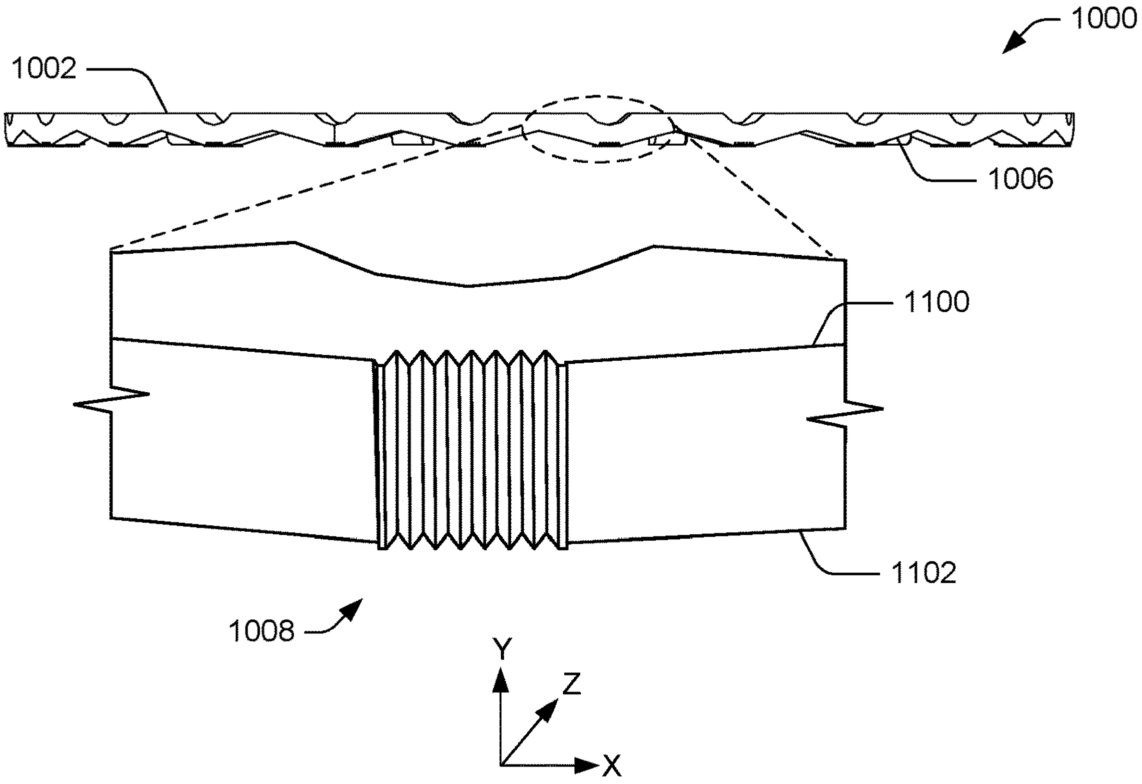
FIG. 11B is an enlarged detail view showing a bottom perspective view of the example light diffuser of FIG. 10, according to an embodiment of the present disclosure.

FIGS. 11A and 11B illustrate a side views of the light diffuser 1000, showing detailed views of the depressions 1004 and the ribs 1008. The depressions 1004 and the protrusions may, individually or collectively, disperse concentrated light energy of the LEDs to maximize a total internal reflection within the light diffuser 1000 and may minimize or eliminate "hot spots" within the light diffuser 1000 and/or the light ring 114.

Beginning with FIG. 11A, the depressions 1004 are shown extending from the top 1002 towards the bottom 1006 in the Y-direction. In some instances, the depressions 1004 may be cylindrical, spherical, hexagonal, square, and/or any combination thereof. The ribs 1008 may include serrated points that disposed adjacent to the LEDs. For instance, when the light diffuser 1000 couples to the top cover 108 the ribs 1008 may be disposed above the LEDs. In some instances, the ribs 1008 may be separated from the LEDs by an air gap, which may range from about 0.5 millimeters to about 3 millimeters. Given the limited spacing between the light diffuser 1000 and the LEDs, the depressions 1004 and/or the ribs 1008 may assist in dispersing or scattering light to eliminate hot spots within the light diffuser 1000 and/or the light ring 114.

As shown in FIG. 11B, the depressions 1004 may extend between an outside perimeter 1100 of the light diffuser 1000 and an inner perimeter 1102 of the light diffuser 1000.

FIGS. 11A and 11B illustrate that the individual ribs 1008 may comprise multiple serrations aligned horizontally (X-direction) and curving (Z-direction) with a curvature of the light diffuser 1000. Additionally, although FIGS. 11A and 11B illustrate a certain amount of ribs 1008, the light diffuser 1000 may include more than or less than the amount of ribs 1008 as shown.

Figure 12:
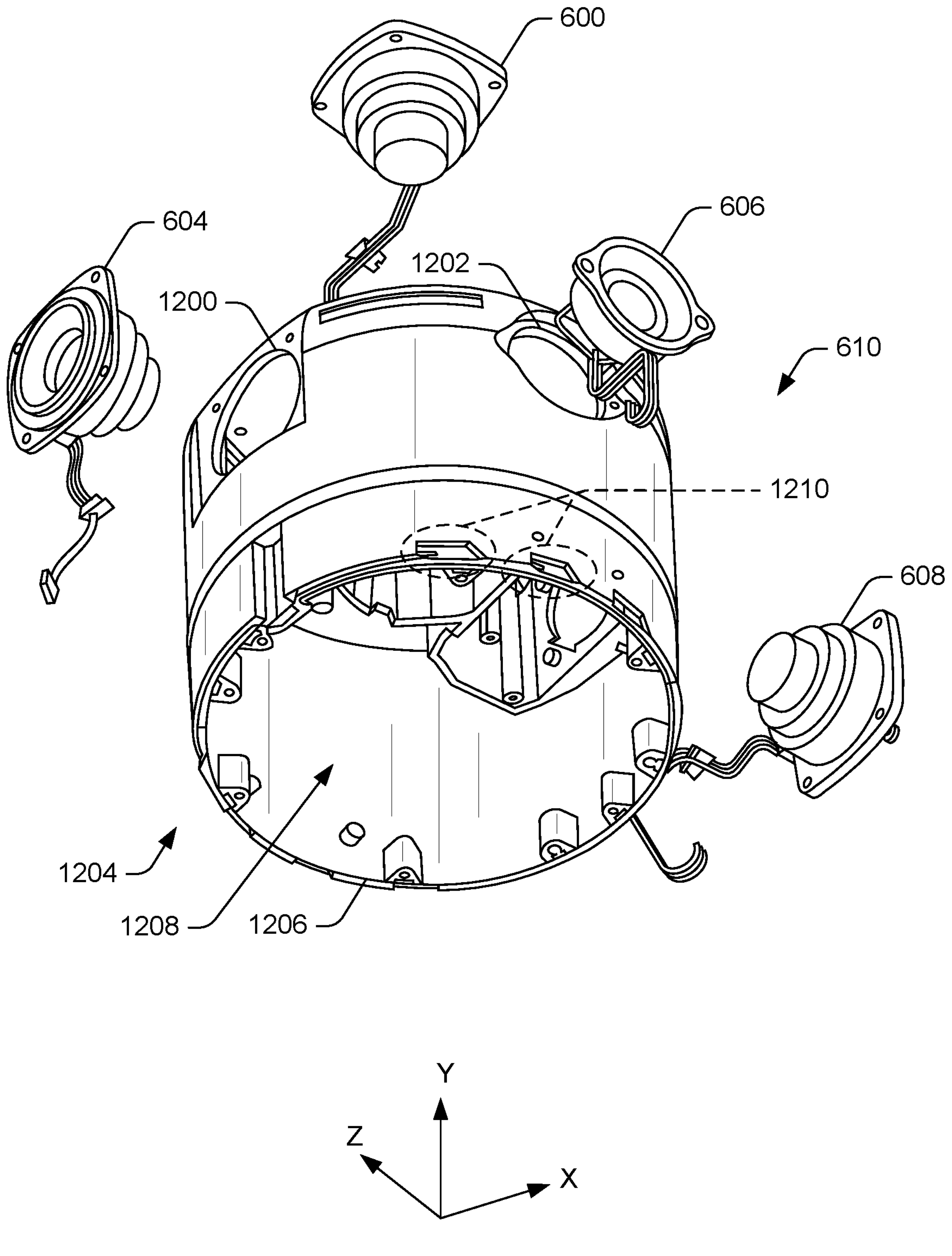
FIG. 12 illustrates an example housing and one or more loudspeakers of the example electronic device of FIG. 1, according to an embodiment of the present disclosure.

FIG. 12 illustrates a partially exploded view of the electronic device 100, showing the first loudspeaker 600, the third loudspeaker 604, the fourth loudspeaker 606, and the fifth loudspeaker 608 disposed from the cabinet 610. To receive the loudspeakers, the cabinet 610 may include openings extending through a thickness, or sidewall, of the cabinet 610. For instance, the cabinet 610 may include a first opening 1200 through which the third loudspeaker 604 is disposed and a second opening 1202 through which the fourth loudspeaker 606 is disposed.

A bottom 1204 of the cabinet 610 may include an opening 1206 that provides access to an interior, or cavity 1208, of the cabinet 610. Within the cavity 1208 components of the electronic device 100 may reside. For instance, returning briefly to FIGS. 7A and 7B, components such as the second PCB 622 and the second loudspeaker 602 may reside within the cavity 1208.

The bottom 1204 of the cabinet 610 may include attachment mechanisms 1210 for engaging or coupling with corresponding attachment mechanisms on other components of the electronic device 100. For instance, as discussed herein, the attachment mechanisms 1210 may engage with corresponding attachment mechanisms on the bottom loudspeaker port 632. The attachment mechanisms 1210 may be disposed proximate to the bottom 1204 of the cabinet 610 and may angularly span around at least a portion of a perimeter, circumference, or periphery of the cabinet 610. For instance, the attachment mechanisms 1210 may angularly span around at least a portion of the opening 1206. In some instances, the attachment mechanisms 1210 may resemble tabs, hooks, protrusions, keys, keyways, slots, or other male/female connectors that are complimentary to engage with attachment mechanisms on the bottom loudspeaker port 632. Moreover, while the attachment mechanisms 1210 are shown located on an exterior surface of the cabinet 610, additionally, or alternatively, the attachment mechanisms 1210 may be disposed on an interior surface, within the cavity 1208, of the cabinet 610.

Figure 13:
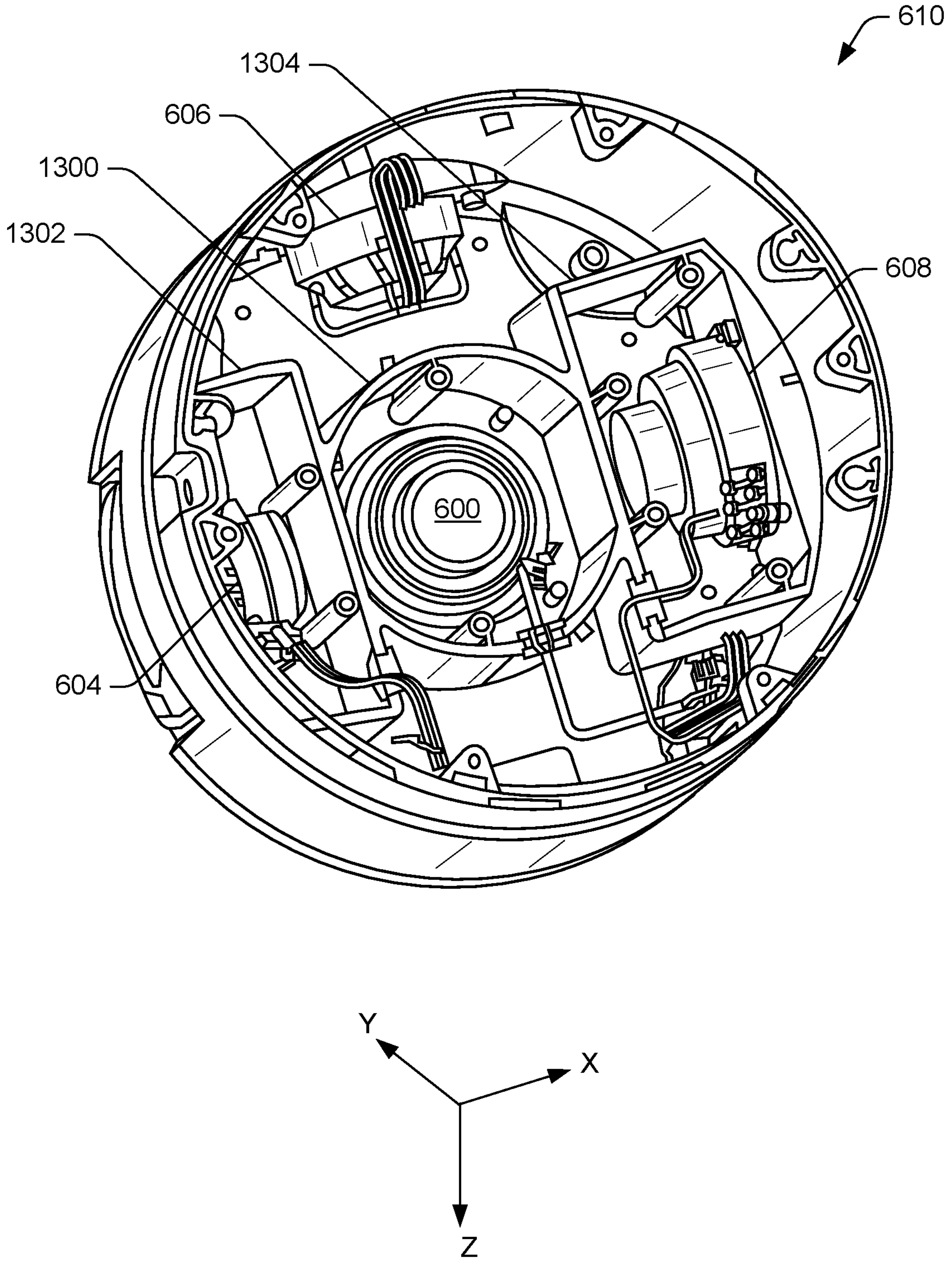
FIG. 13 illustrates the example housing and the one or more loudspeakers of FIG. 12, showing the one or more loudspeakers coupled to the housing, according to an embodiment of the present disclosure.

FIG. 13 illustrates the loudspeakers of the electronic device 100 coupled to and being disposed within the cabinet 610. As shown, the first loudspeaker 600 may fire towards the top 102 of the electronic device 100, the third loudspeaker 604 may radially fire towards a first side of the electronic device 100, the fourth loudspeaker 606 may fire towards a front of the electronic device 100, and the fifth loudspeaker 608 may radially fire towards a second side of the electronic device 100. As such, in some instances, the third loudspeaker 604, the fourth loudspeaker 606, and the fifth loudspeaker 608 may be radially disposed around the first loudspeaker 600.

The cabinet 610 may include compartments, enclosures, or cavities that provide separate back volumes for one or more of the loudspeakers. For instance, the cabinet 610 may include cavities that provide back volumes for each of the mid-range loudspeakers. The back volumes may optimize movement of diaphragms of the one or more loudspeakers and may enhance the volume of sound produced by the loudspeakers. The cabinet 610 may include a first cavity 1300 for the first loudspeaker 600, a second cavity 1302 for the third loudspeaker 604 that is separate from the first cavity 1300, and a third cavity 1304 for the fifth loudspeaker 608 that is separate from the first cavity 1300 and the second cavity 1302. Respectively, the first cavity 1300 may provide a first back volume for the first loudspeaker 600, the second cavity 1302 may provide a second back volume for the third loudspeaker 604, and the third cavity 1304 may provide a third back volume for the fifth loudspeaker 608. In some instances, the back volumes may range from about 100 cubic centimeters to about 150 cubic centimeters. Additionally, the back volume for the first loudspeaker 600 may be larger than the back volume for the third loudspeaker 604 and the fifth loudspeaker 608, and/or the back volume for the third loudspeaker 604 may be larger than the back volume for the fifth loudspeaker 608. For instance, the first back volume may be 145.3 cubic centimeters, the second back volume may be 123 cubic centimeters, and the third back volume may be 115.7 cubic centimeters. However, the first back volume, the second back volume, and the third back volume may respectively include back volumes that are less than or more than those described herein. Moreover, in some instances, the cabinet 610 may provide a back volume for the second loudspeaker 602 and the fourth loudspeaker 606. In some instances, the second loudspeaker 602 and the fourth loudspeaker 606 may share a back volume within the cavity 1208.

The seal cap 634 may couple to the cabinet 610 to enclose the first cavity 1300, the second cavity 1302, and/or the third cavity 1304 from the bottom (e.g., Z-direction). The seal cap 634 may couple to the cabinet 610 to assist in providing the respective back volumes to the first loudspeaker 600, the third loudspeaker 604, and/or the fifth loudspeaker 608. Additionally, as noted above, the seal cap 634 may be a 3D seal that also extends in X- and Y-directions to seal the first cavity 1300, the second cavity 1302, and/or the third cavity 1304.

Figure 14:
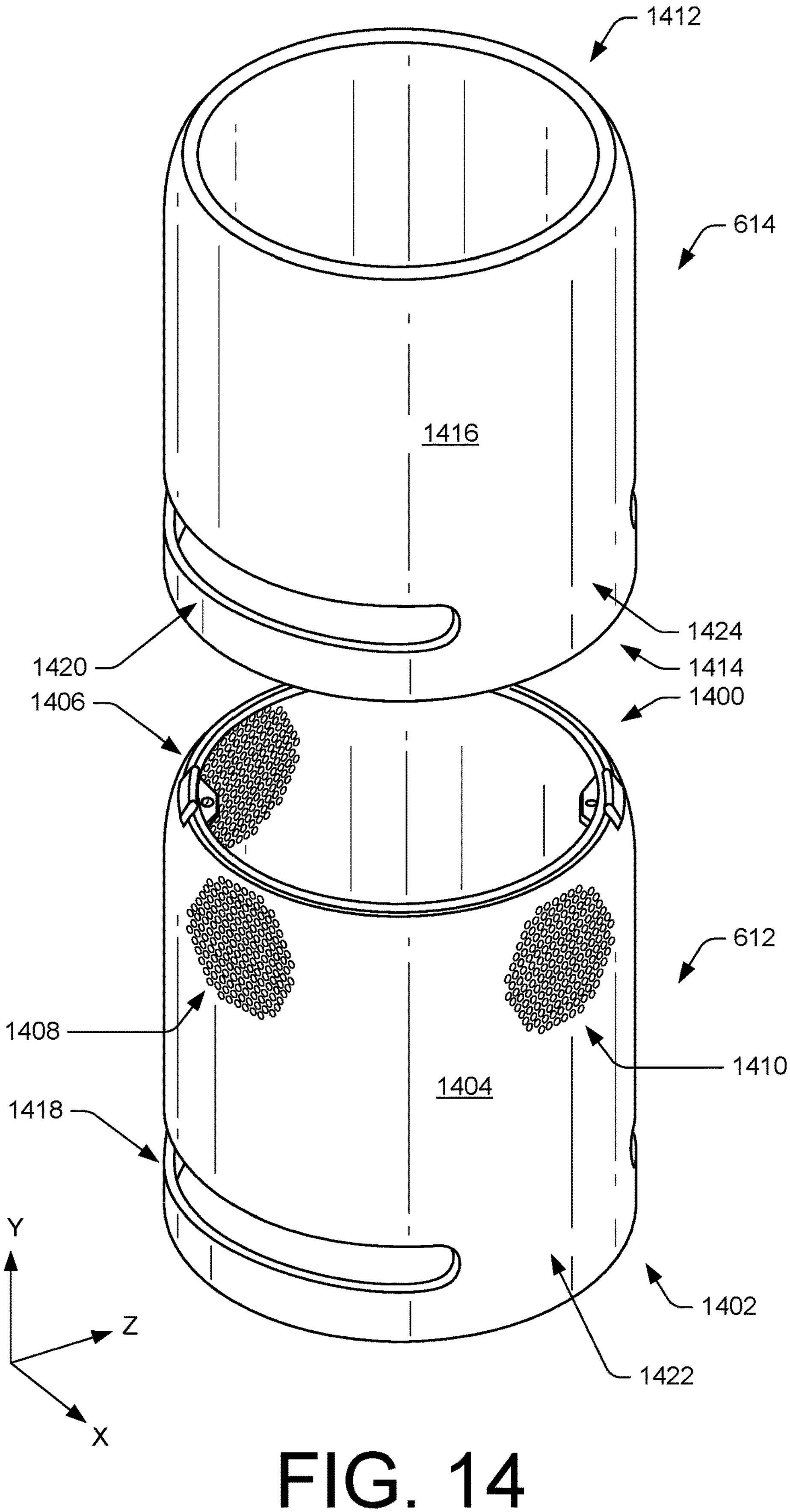
FIG. 14 illustrates an example sleeve and an example grill of the example electronic device of FIG. 1, according to an embodiment of the present disclosure.

FIG. 14 illustrates the sleeve 612 and the grill 614, showing the grill 614 disposed above the sleeve 612 (Y-direction). As shown, the sleeve 612 may include a substantially cylindrical shape. The sleeve 612 may include a top end 1400 and a bottom end 1402. In some instances, the top end 1400 may include a diameter or cross-sectional distance that is less than a diameter or cross-sectional distance at the bottom end 1402. That is, as shown, an exterior surface 1404 of the sleeve 612 may taper as the exterior surface 1404 extends from the bottom end 1402 towards the top end 1400 of the sleeve 612 (Y-direction).

The sleeve 612 may include orifices that partially or completely extend through a thickness or sidewall of the sleeve 612. In some instances, the orifices may be located proximate to the top end 1400 of the sleeve 612. The orifices may be arranged into separate groups and may be spaced apart from one another around a circumference or periphery of the sleeve 612. When the sleeve 612 couples to the cabinet 610, as discussed in FIG. 15B, respective orifices may be positioned adjacent to the loudspeakers to output sound emitted from the loudspeakers. In some instances, openings of the orifices, or a shape of the orifices, may take a patterned look and/or may resemble a plurality of shapes, including being circular, square, hexagonal, or any combination thereof.

To illustrate, as shown in FIG. 14, the sleeve 612 may include first orifices 1406, second orifices 1408, and third orifices 1410. When the sleeve 612 couples to the cabinet 610, the first orifices 1406 may be disposed adjacent to the third loudspeaker 604, the second orifices 1408 may be disposed adjacent to the fourth loudspeaker 606, and the third orifices 1410 may be disposed adjacent to the fifth loudspeaker 608.

The grill 614 may include a substantially cylindrical shape having a top end 1412 and a bottom end 1414. In some instances, the top end 1412 may include a diameter or cross-sectional distance that is less than a diameter or cross-sectional distance at the bottom end 1414. That is, as shown in FIG. 14, an exterior surface 1416 of the grill 614 may taper as the exterior surface 1416 extends toward the top end 1412 (Y-direction).

The grill 614 may be sized and configured to reside or slide over the exterior surface 1404 of the sleeve 612. In some instances, the exterior surface 1416 of the grill 614 may be seamless to provide the electronic device 100 with an aesthetic appearance. The grill 614 may also conceal the orifices in the sleeve 612 (e.g., the first orifices 1406) while still permitting sound generated by the loudspeakers (e.g., third loudspeaker 604) to pass through.

In some examples, an appearance of the electronic device 100 may be modified through interchanging the grill 614. That is, the exterior surface 1416 of the grill 614 may represent, or correspond to, the exterior surface 106 of the electronic device 100. Interchanging the grill 614 may increase an aesthetic appearance of the electronic device 100 in difference environments. For instance, in a setting that includes wood furniture, accents, molding, etc., the electronic device 100 may have a grill 614 that includes a wood-grained exterior finish. In other instances, such as in a kitchen with stainless steel appliances, a grill 614 with a brushed-metal exterior finish may be more appealing. In other instances, the grill 614 may be a woven or non-woven fabric or mesh material. A material of the grill 614 may be seamless, so as to create a smooth aesthetic appearance.

The sleeve 612 and the grill 614 may include respective openings that correspond to the one or more openings 118 (i.e., the first opening 200 and the second opening 202) of the electronic device 100. In other words, the sleeve 612 and the grill 614 may include openings that align to correspond to the one or more openings 118 of the electronic device 100. For instance, the sleeve 612 may include one or more openings 1418 on multiple sides of the sleeve 612, such as a front and a back, while the grill 614 may include one or more openings 1420 on multiple sides of the grill 614, such as a front and a back. As discussed herein, the grill 614 may couple to the sleeve 612, and when the sleeve 612 couples to the cabinet 610, the one or more openings 1418 of the sleeve 612 may align with the one or more openings 1420 of the grill 614 to form the one or more openings 118 of the electronic device 100.

FIG. 14 further illustrates that the sleeve 612 may include one or more legs or columns 1422 and/or the grill 614 may one or more legs or columns 1424. In some instances, the columns 1422 and the columns 1424 may be located on opposing sides of the sleeve 612 and the grill 614, respectively. The columns 1422 and the columns 1424 may correspond to the columns 218 that are interposed between the one or more openings 118 of the electronic device 100. That is as noted above, the columns 218 may extend between the top portion 212 and the bottom portion 214 of the electronic device 100, and the columns 1422 and the columns 1624 may partially conceal wires, for instance, routed between the top portion 212 and the bottom portion 214.

Figure 15A:
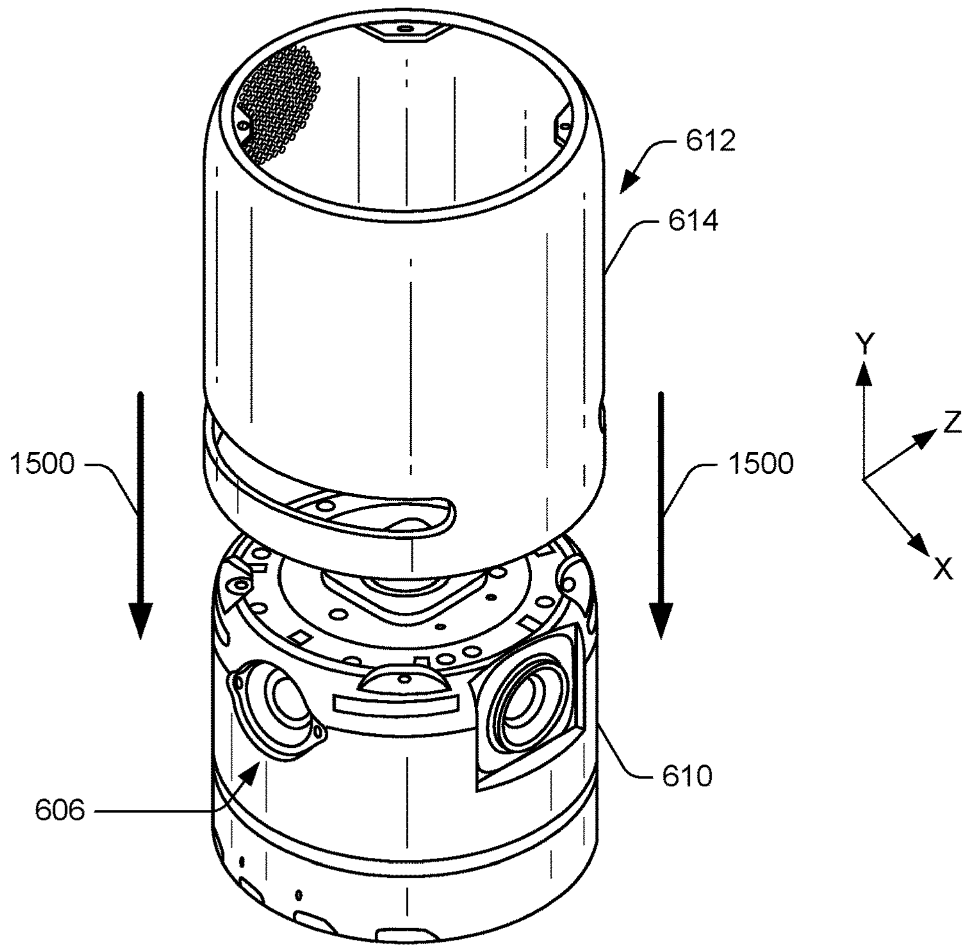
FIG. 15A illustrates the example sleeve and the example grill of FIG. 14 coupled together, according to an embodiment of the present disclosure.
Figure 15B:
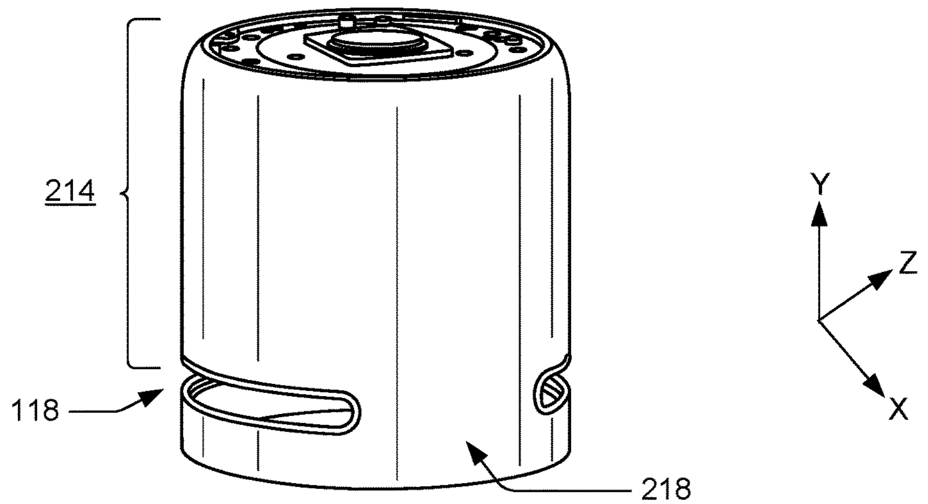
FIG. 15B illustrates the example sleeve and the example grill of FIG. 14 disposed over the housing of FIG. 12, according to an embodiment of the present disclosure.

FIGS. 15A and 15B illustrate a coupling of the sleeve 612 and the grill 614 to the cabinet 610. More particularly, FIG. 15A illustrates the sleeve 612 and the grill 614 coupled together and being disposed above the cabinet 610 (Y-direction), while FIG. 15B illustrates the sleeve 612 and the grill 614 being coupled to the cabinet 610.

Beginning with FIG. 15A, the grill 614 may engage with a corresponding surface of the sleeve 612, such as the exterior surface 1404 of the sleeve 612. For instance, the bottom end 1414 of the grill 614 may slide over (Y-direction) the top end 1400 of the sleeve 612. In doing so, the top end 1400 of the sleeve 612 may be aligned or proximate to the top end 1412 of the sleeve 612, and correspondingly, the bottom end 1402 of the sleeve 612 may be aligned or proximate to the bottom end 1414 of the grill 614. Coupling of the sleeve 612 and the grill 614 may come by way of snap-fit, magnets, mechanical fasteners, adhesion, pressure fit, or a combination thereof. Once coupled together, the one or more openings 1418 of the sleeve 612 may align with the one or more openings 1420 of the grill 614 to as to form the one or more openings 118 of the electronic device 100 (i.e., the first opening 200 and the second opening 202).

In some instances, the sleeve 612 may provide support or structural rigidity to the grill 614. The sleeve 612 and/or the grill 614 may include corresponding alignment elements, tabs, or mechanisms that align the sleeve 612 and the grill 614, so as to insure the one or more openings 1418 and the one or more openings 1420 align, for instance.

Once the sleeve 612 and the grill 614 couple together, the sleeve 612 and the grill 614 may slide over (Y-direction) the cabinet 610, as shown by directional arrows 1500. That is, turning to FIG. 15B, the sleeve 612 and the grill 614 are shown coupled to the cabinet 610. In some instances, to coordinate the positioning of the sleeve 612 and the grill 614 on the cabinet 610, the sleeve 612 and/or the grill 614 may include alignment elements, tabs, or mechanisms that align with corresponding alignment elements, tabs, or mechanisms on the cabinet 610. The respective alignment mechanisms, for instance, may insure that the orifices of the sleeve 612 align with the loudspeakers coupled to the cabinet 610. For instance, the sleeve 612 may include a first alignment mechanism that couples to or engages with a second alignment on the cabinet 610 to align the second orifices 1408 with the fourth loudspeaker 606. In some instances, coupling of the sleeve 612 to the cabinet 610 may come by way of snap-fit, magnets, mechanical fasteners, adhesion, pressure fit, or a combination thereof.

When coupled together, the cabinet 610 may reside above (e.g., Y-direction), above the one or more openings 118 of the electronic device 100. In other words, the cabinet 610 may reside within the top portion 212 of the electronic device 100 and the first loudspeaker 600 may protrude or exposed through the top end 1400 of the sleeve 612 and the top end 1412 of the grill 614.

Figure 16:
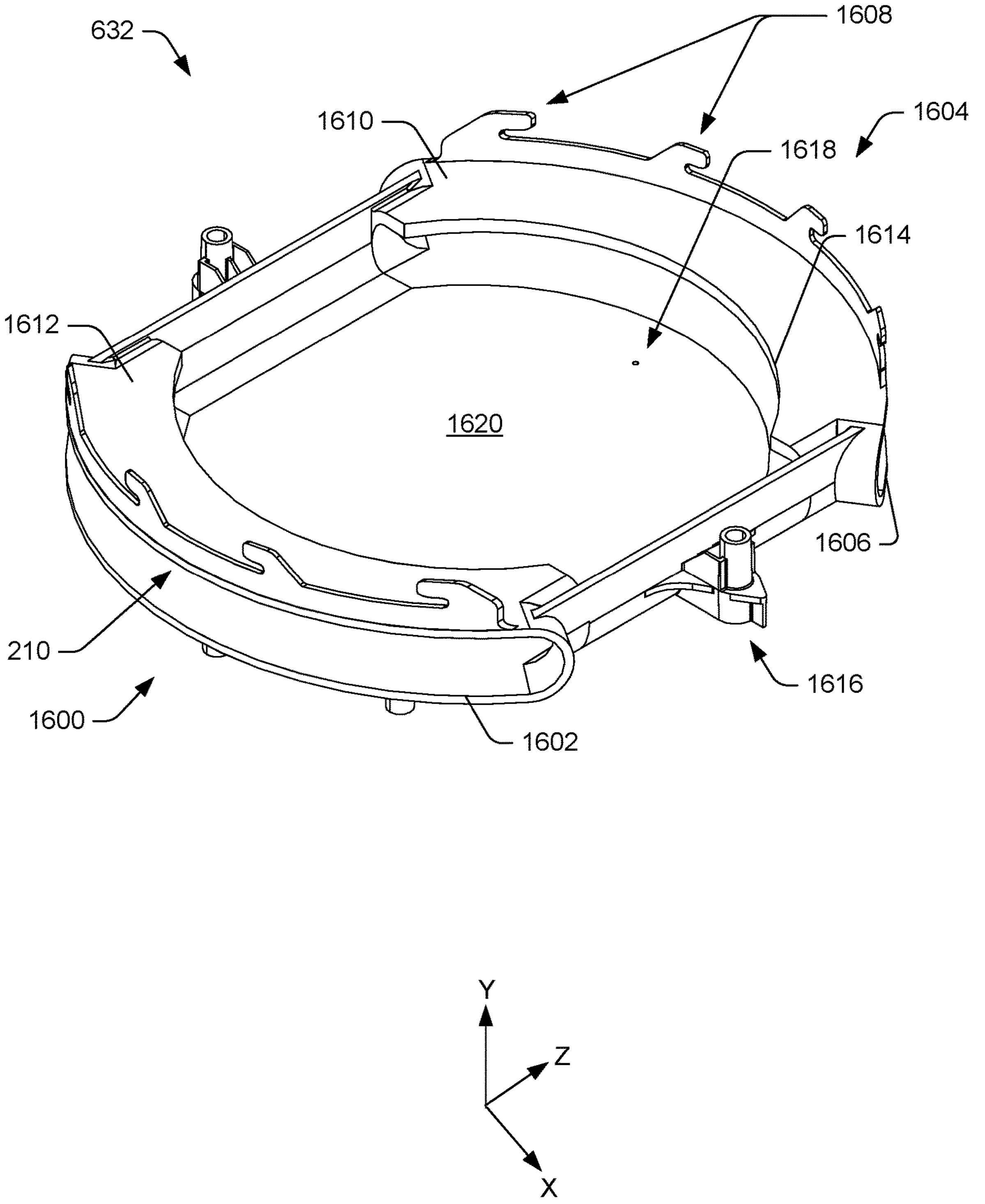
FIG. 16 is a perspective view of an example bottom loudspeaker port of the example electronic device of FIG. 1, according to an embodiment of the present disclosure.

FIG. 16 illustrates a perspective view of the bottom loudspeaker port 632. As noted above, in some instances, the bottom loudspeaker port 632 may be disposed between the top portion 212 and the bottom portion 214 of the electronic device 100. Accordingly, the bottom loudspeaker port 632 may be sized and configured to be insertable into an interior of the electronic device 100, such as the sleeve 612.

The bottom loudspeaker port 632 may be partially cylindrical with one or more openings disposed at/in diametrically opposing sides or surfaces. The openings disposed on/in the bottom loudspeaker port 632 may correspond to the one or more openings 118 of the electronic device 100. For instance, on a first side 1600, the bottom loudspeaker port 632 may include a first opening 1602 and, on a second side 1604, the bottom loudspeaker port 632 may include a second opening 1606. The first opening 1602 and the second opening 1606 may correspond to the first opening 200 and the second opening 202 of the electronic device 100, respectively. Moreover, the first opening 1602 and the second opening 1606 may align, respectively, with the one or more openings 1418 in the sleeve 612 and the one or more openings 1420 in the grill 614.

The bottom loudspeaker port 632 may further include the channel 210 extended between the first opening 1602 and the second opening 1606.

The bottom loudspeaker port 632 may be insertable through an opening in the sleeve 612 to couple to the cabinet 610. For instance, the bottom loudspeaker port 632 may include attachment mechanisms 1608 that are configured to engage with or couple to corresponding attachment mechanisms on the cabinet 610, such as the attachment mechanisms 1210. In some instances, the attachment mechanisms 1608 on the bottom loudspeaker port 632 and the attachment mechanisms 1210 on the cabinet 610 may be configured to engage via rotational movement (e.g., about the Y-axis).

The attachment mechanisms 1608 may be disposed around a least a portion of a perimeter, exterior, or periphery of the bottom loudspeaker port 632 and may resemble tabs, hooks, protrusions, keys, keyways, slots, or other male/female connectors. For instance, the attachment mechanisms 1608 may be located on the first side 1600 and the second side 1604 of the bottom loudspeaker port 632. In addition, being as the cabinet 610 is disposed within the sleeve 612, the attachment mechanisms 1608 may be sized to fit through the opening 1206 in the sleeve 612. Although FIG. 16 illustrates that the attachment mechanisms 1608 include eight attachment mechanisms, four being disposed on/in the first side 1600 and four additional being disposed on/in the second side 1604, the bottom loudspeaker port 632 may include more than or less than eight attachment mechanisms 1608, or may include more than or less than four attachment mechanisms disposed on/in the first side 1600 and/or the second side 1604.

In some instances, the bottom loudspeaker port 632 may support secure components within the electronic device 100. For instance, once coupled to the cabinet 610, the second loudspeaker 602 may rest on a first upper surface 1610 and/or a second upper surface 1612 of the bottom loudspeaker port 632. For instance, a frame or basket of the second loudspeaker 602 may abut, couple to, contact, or rest on the first upper surface 1610 and the second upper surface 1612. In doing so, the diaphragm of the second loudspeaker 602 may at least partially occupy an opening 1614 between the first upper surface 1610 and the second upper surface 1612, or within the channel 210. In other words, at least a portion of the diaphragm of the second loudspeaker 602 may hang through the opening 1614 such that the diaphragm is visible through the one or more openings 118 of the electronic device 100.

The bottom loudspeaker port 632 may include one or more columns 1616 through which one or more screws, or other fasteners, may extend. For instance, one or more screws may extend through the one or more columns 1616 to couple components residing within the bottom portion 214 of the electronic device 100 to the cabinet 610, as discussed herein with regard to FIG. 21.

Additionally, the bottom loudspeaker port 632 may include a microphone port 1618 disposed through a bottom surface 1620. When the second loudspeaker 602 fires, the microphone port 1618 may channel sound generated by the second loudspeaker 602 to the microphone 702 residing within the bottom portion 214 of the electronic device 100. Audio captured and/or generated by the microphone 702 may be used for AEC and noise cancellation.

In some instances, portions of the bottom loudspeaker port 632 may be visible from an exterior of the electronic device 100, or may be visible once the electronic device 100 is assembled. For instance, when the bottom loudspeaker port 632 couples to the cabinet 610, portions of the first side 1600 and/or portions of the second side 1604 may be visible from an exterior of the electronic device 100. Accordingly, since portions of the bottom loudspeaker port 632 may be visible, the bottom loudspeaker port 632 may have a plurality of surface finishes, such as being textured, polished, brushed, or smoothed to maintain a cosmetic appearance.

Figure 17A:
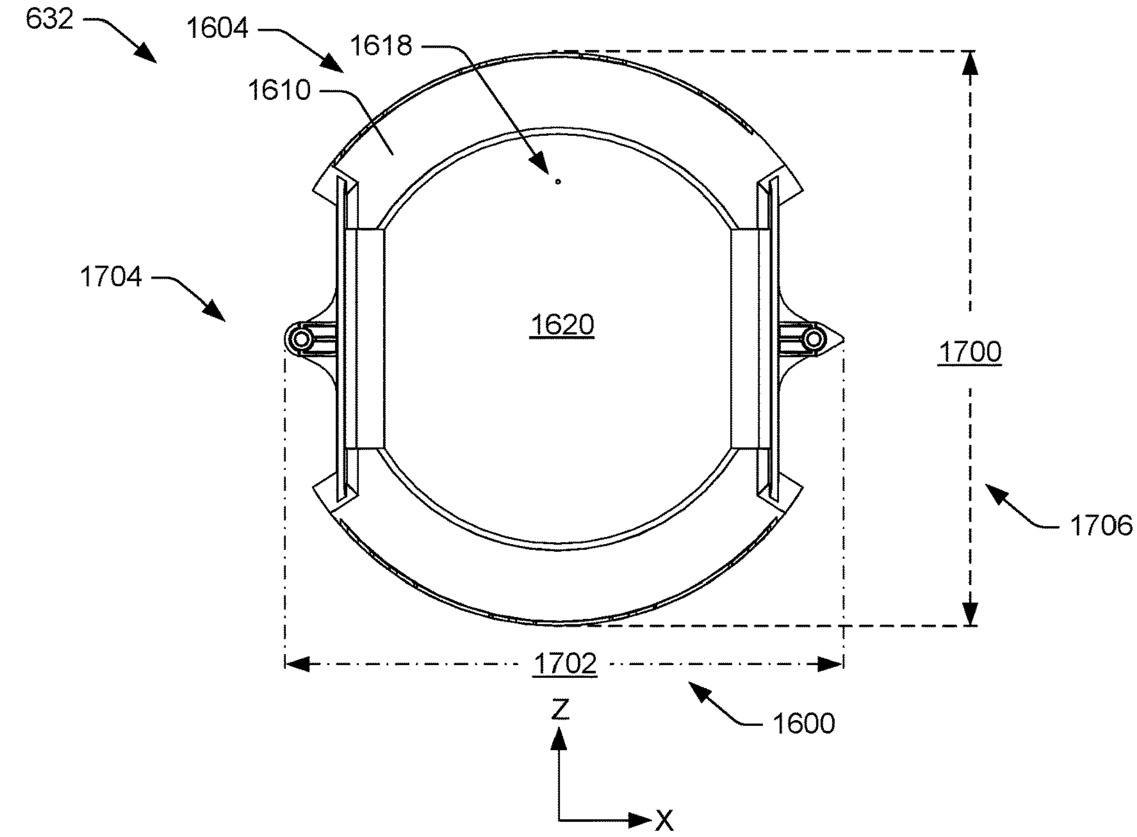
FIG. 17A is a top view of the example bottom loudspeaker port of FIG. 16, according to an embodiment of the present disclosure.
Figure 17B:
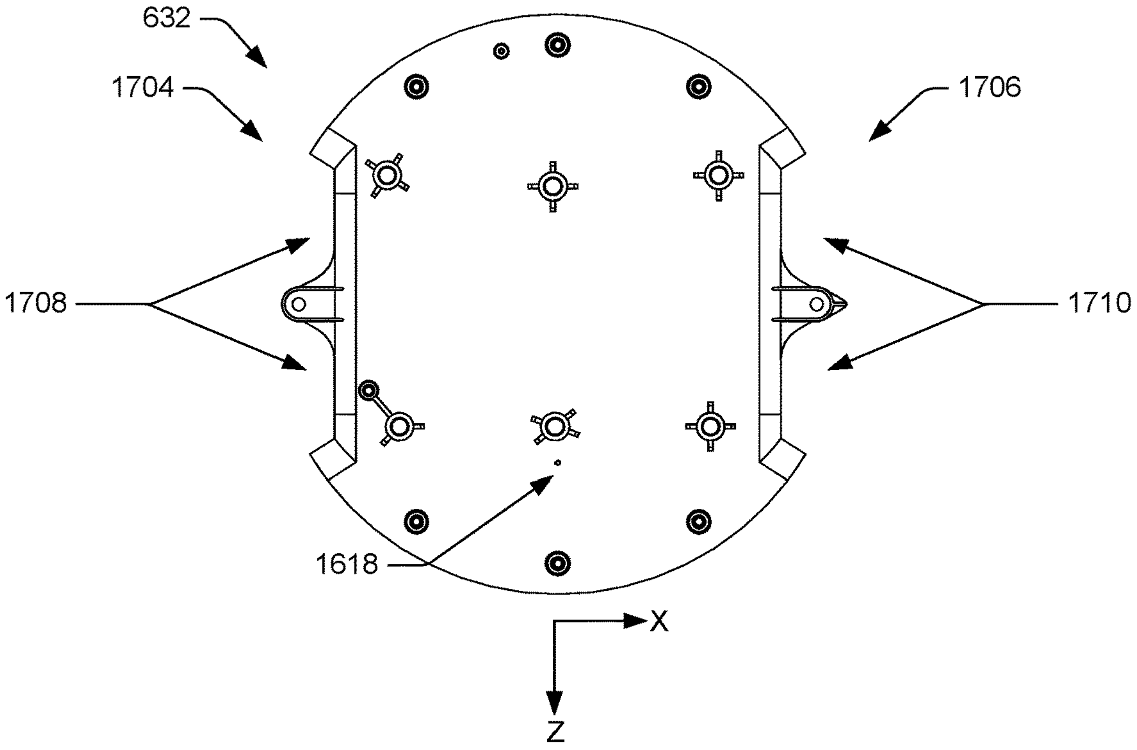
FIG. 17B is a bottom view of the example bottom loudspeaker port of FIG. 16, according to an embodiment of the present disclosure.

FIGS. 17A and 17B illustrate a top view and a bottom view of the bottom loudspeaker port 632, respectively. As noted above, the bottom loudspeaker port 632 may be insertable through an opening of the sleeve 612 to couple with the cabinet 610. As such, a cross-sectional dimension of the bottom loudspeaker port 632, such as a first diameter 1700, may be sized to fit through a cross-sectional dimension of the bottom end 1402 of the sleeve 612. In some instances, the first diameter 1700 may be between diametrically opposed points on the first side 1600 and the second side 1604 of the bottom loudspeaker port 632. Additionally, the first side 1600 and the second side 1604 may include a curvature or peripheral profile that matches or corresponds to a curvature of the sleeve 612. In some instances, the first diameter 1700 may be substantially equal to a cross-sectional dimension between diametrically opposed points on the inner surface of the sleeve 612. In doing so, the bottom loudspeaker port 632 may snuggly fit within the sleeve 612 with minimal tolerance between the first side 1600 and the inner surface of the sleeve 612, as well as the second side 1604 and the inner surface of the sleeve 612.

The bottom loudspeaker port 632 may include a second cross-sectional dimension, or second diameter 1702, between a first lateral side 1704 and a second lateral side 1706. In some instances, the second diameter 1702 may be equal to, or substantially equal to the first diameter 1700. However, FIGS. 17A and 17B illustrate that the first lateral side 1704 and the second lateral side 1706 may include one or more passageways or voids. For instance, the first lateral side 1704 may include one or more voids 1708, and the second lateral side 1706 may include one or more voids 1710. When the bottom loudspeaker port 632 couples to the cabinet 610, the one or more voids 1708 on the first lateral side 1704 and the one or more voids 1710 on the second lateral side 1706 may provide passageways, ducts, or routes through which components may extend or reside. For instance, wires, optical fibers, or electrical components may extend through the one or more voids 1708 and/or the one or more voids 1710 to communicatively couple the top portion 212 of the electronic device 100 with the bottom portion 214 of the electronic device 100. As an example, because the ports 216 are located in the bottom portion 214, including the voids 1708 and the voids 1710 may permit power to be routed therethrough to maintain a clean aesthetic appearance of the electronic device 100.

In some instances, each void of the voids 1708 may extend between a first column of the one or more columns 1616 on the first lateral side 1704 and the first opening 1602, and the first column of the one or more columns 1816 on the first lateral side 1704 and the second opening 1606. Furthermore, each void of the voids 1710 may extend between a second column of the one or more columns 1616 on the second lateral side 1706 and the first opening 1602, and the second column of the one or more columns 1616 on the second lateral side 1706 and the second opening 1606.

As shown in FIG. 17A, the microphone port 1618 may be disposed through the bottom surface 1620 proximate to the first upper surface 1610 or the second side 1604. In some instances, the microphone port 1618 may be aligned with a central Z-axis of the electronic device 100, spaced apart from the central longitudinal axis 700 of the electronic device 100 in the Z-direction.

Figure 18A:
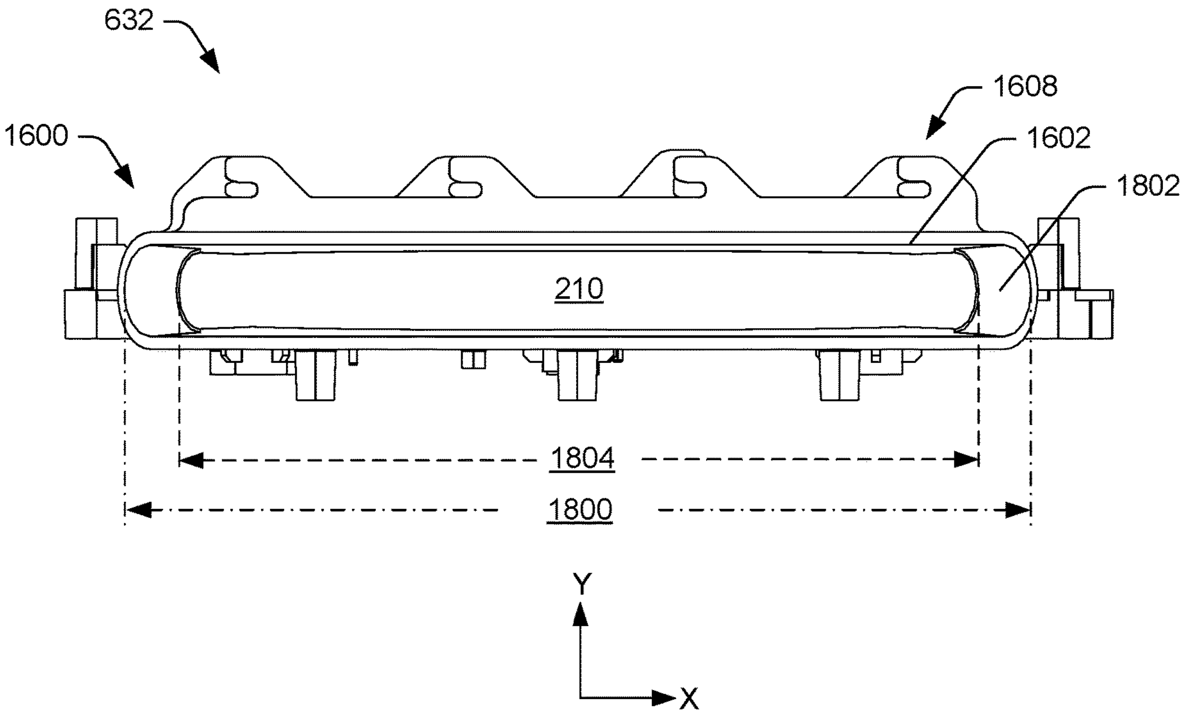
FIG. 18A is a first side view of the example bottom loudspeaker port of FIG. 16, according to an embodiment of the present disclosure.
Figure 18B:
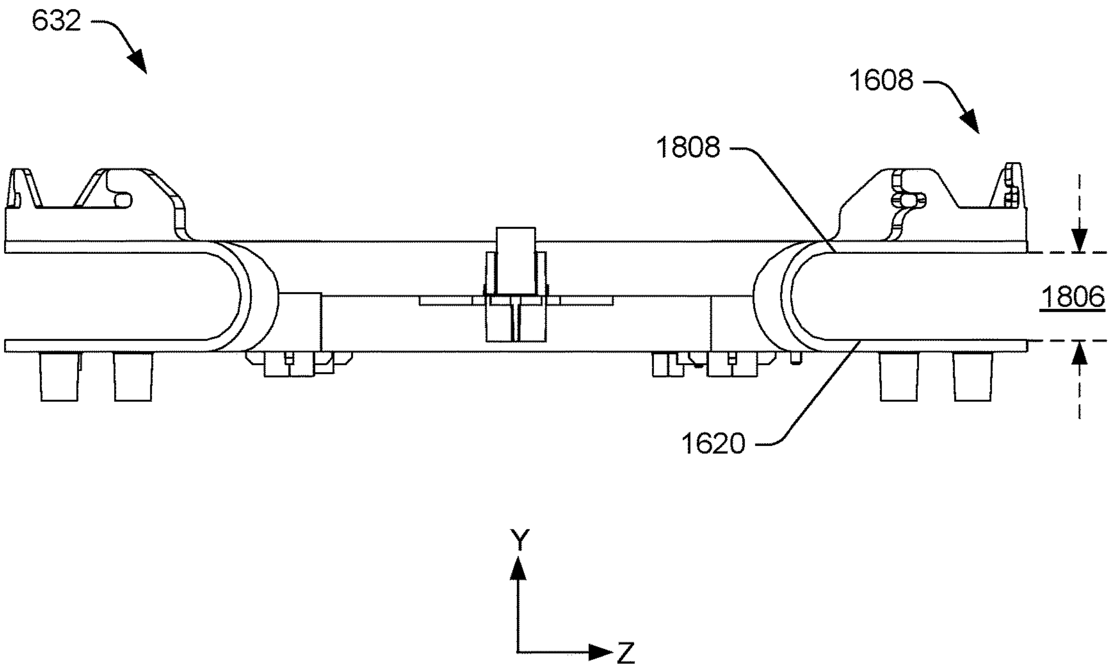
FIG. 18B is a second side view of the example bottom loudspeaker port of FIG. 16, according to an embodiment of the present disclosure.

FIGS. 18A and 18B illustrate a front view and a side view of the bottom loudspeaker port 632, respectively. Beginning with FIG. 18A, the bottom loudspeaker port 632 may include the first opening 1602 disposed on/in the first side 1600. Between the first opening 1602 and the second opening 1606 disposed on/in the second side 1604, the channel 210 may extend through the bottom loudspeaker port 632.

In some instances, the first opening 1602 may include a first dimension 1800 disposed at a periphery, or outermost radial surface, of the bottom loudspeaker port 632. As the first opening 1602 extends into the bottom loudspeaker port 632 (Z-direction), a sidewall 1802 of the bottom loudspeaker port 632 may taper inward (X-direction). In doing so, the first opening 1602 may include a second dimension 1804, spaced apart in the Z-direction, that is less than the first dimension 1800. The second opening 1606 may similarly include like dimensions and geometries as the first opening 1602.

As shown in FIG. 18B, a distance 1806 may extend between the bottom surface 1620 and a top surface 1808 of the bottom loudspeaker port 632. In some instances, the distance 1806 may correspond to the height 204 to allow the diaphragm of the second loudspeaker 602 to fire within the channel 210 without contacting the bottom surface 1620, while also allowing for an air gap disposed between the bottom surface 1620 during a maximum excursion the diaphragm of the second loudspeaker 602.

FIGS. 18A and 18B further illustrate the attachment mechanisms 1608 of the bottom loudspeaker port 632. As shown in FIG. 18B, the attachment mechanisms 1608 on the first side 1600 and the second side 1604 may curve with a peripheral profile of the bottom loudspeaker port 632.

Figure 19:
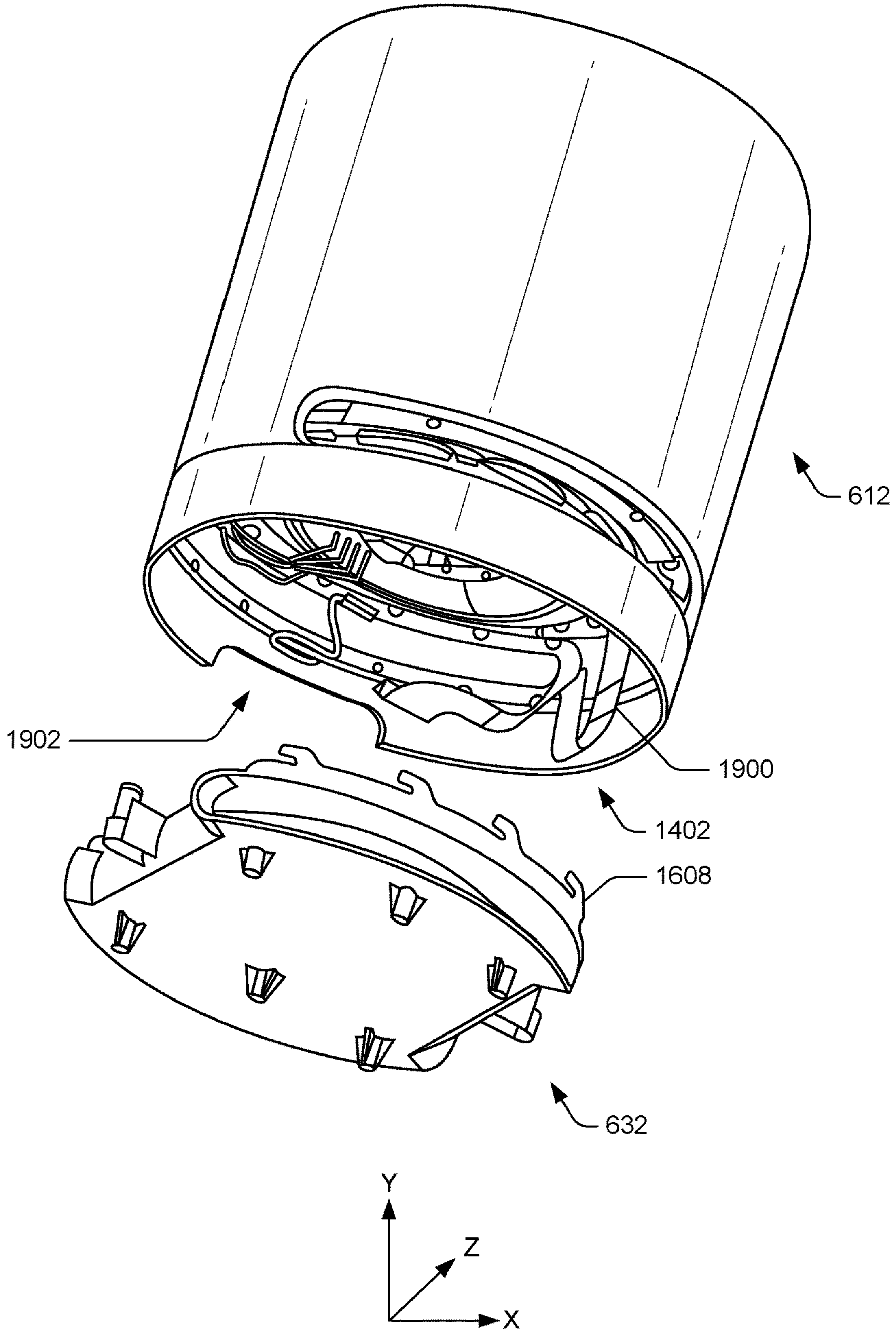
FIG. 19 is a partially exploded view of the example electronic device of FIG. 1, showing the example bottom loudspeaker port of FIG. 16 disposed beneath the example electronic device of FIG. 1, according to an embodiment of the present disclosure.

FIG. 19 illustrates a partially exploded view of the electronic device 100, showing the bottom loudspeaker port 632 separated from the electronic device 100 (Y-direction). As will be shown in FIG. 19, the bottom loudspeaker port 632 may be sized and configured to insert through an opening in the bottom end 1402 of the sleeve 612 (and in some instances, an opening at the bottom end 1414 of the grill 614). Accordingly, when inserted into the opening, the bottom loudspeaker port 632 may couple to the cabinet 610 via the attachment mechanisms 1608 on the bottom loudspeaker port 632 interacting or otherwise engaging with the attachment mechanisms 1210 on the cabinet 610. In some instances, the attachment mechanisms 1608 may engage with the attachment mechanisms 1210 through rotating the bottom loudspeaker port 632, and once rotated, the attachment mechanisms 1608 may engage with the attachment mechanisms 1210 to couple the bottom loudspeaker port 632 to the cabinet 610.

Reference is now made to the Cartesian (X-Y-Z) coordinate system to discuss the assembly of the bottom loudspeaker port 632 to the cabinet 610. The bottom loudspeaker port 632 may be inserted through bottom end 1402 of the sleeve 612 and/or the bottom end 1414 of grill 614 in the Y-direction. Thereafter, the bottom loudspeaker port 632 may rotate about the Y-axis in the counter-clockwise direction to couple the bottom loudspeaker port 632 to the cabinet 610.

As noted above with regard to the discussion of the bottom loudspeaker port 632, adjacent lateral sides (i.e., the first lateral side 1704 and the second lateral side 1706) of the bottom loudspeaker port 632 may include the voids, respectively, through which wires may run. For instance, a flexible printed circuit board (FPCB) 1900 may connect processing between the top portion 212 and the bottom portion 214. In some instances, the FPCB 1900 or may provide signals to the loudspeakers residing within the top portion 212. As such, the FPCB 1900 may electronically connect components within the top portion 212 and the bottom portion 214.

FIG. 19 further illustrates that the sleeve 612 and/or the grill 614, or the exterior surface 106 of the electronic device, may include a notch 1902 for the ports 216.

Figure 20:
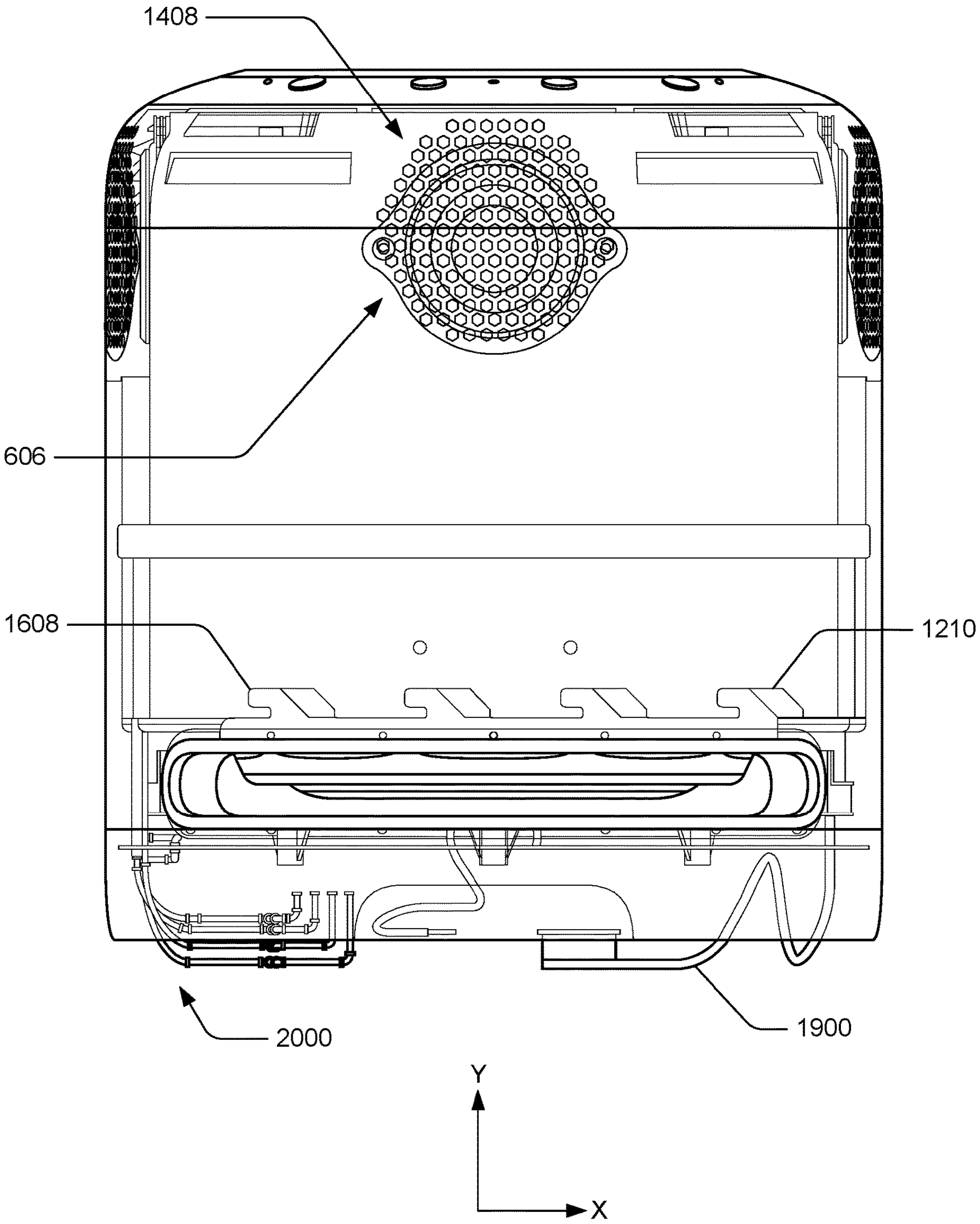
FIG. 20 is a side view illustrating the example bottom loudspeaker port of FIG. 16 coupling to the example electronic device of FIG. 1, according to an embodiment of the present disclosure.

FIG. 20 illustrates a front view of the electronic device 100, showing the sleeve 612 and the grill 614 as translucent to illustrate components residing therebeneath. For instance, the sleeve 612 and the grill 614 are shown as translucent to illustrate the coupling, or engagement, between the attachment mechanisms 1210 on the cabinet 610 and the attachment mechanisms 1608 on the bottom loudspeaker port 632. That is, the bottom loudspeaker port 632 may couple to the cabinet 610 through the attachment mechanisms 1608 disposed on/in the bottom loudspeaker port 632 interacting, engaging, or otherwise coupling with a corresponding attachment mechanism of the attachment mechanisms 1210 disposed on/in the cabinet 610. For instance, by way of example and not limitation, the attachment mechanisms 1608 of the bottom loudspeaker port 632 may include tabs, or keys, while the attachment mechanisms 1210 of the cabinet 610 may include corresponding slots, or keyways, that engages with the individual keys of the attachment mechanisms 1608. Therefore, when the attachment mechanisms 1608 on the bottom loudspeaker port 632 (e.g., key) and the attachment mechanisms 1210 on the cabinet 610 (e.g., keyway) engage, the bottom loudspeaker port 632 may couple to the cabinet 610.

As discussed above, the attachment mechanisms 1210 and the attachment mechanisms 1608 may engage via a rotation movement of the bottom loudspeaker port 632. Accordingly, the attachment mechanisms 1608 on the bottom loudspeaker port 632 and the attachment mechanisms 1210 on the cabinet 610 may be utilized to form a convenient twist-lock mechanism for attaching, or potentially removing, the bottom loudspeaker port 632 to/from the cabinet 610. In some instances, the bottom loudspeaker port 632 may be configured to rotate in predetermined amounts, distances, or degrees to engage/disengage the bottom loudspeaker port 632 and the cabinet 610.

When coupled, the openings in the bottom loudspeaker port 632 may align with the openings in the sleeve 612 and the openings in the grill 614. For instance, the first opening 1602 of the bottom loudspeaker port 632 may align with the one or more openings 1418 of the sleeve 612 and the one or more openings 1420 of the grill 614. Additionally, the second opening 1606 of the bottom loudspeaker port 632 may align with the second opening of the sleeve 612 and the second opening of the grill 614. In doing so, the one or more openings 118 (i.e., the first opening 200 and the second opening 202) may be formed.

In some instances, engaging the attachment mechanisms 1210 and the attachment mechanisms 1608 may enclose or seal access to the cavity 1208 of the cabinet 610. Additionally, or alternatively, coupling the bottom loudspeaker port 632 to the cabinet 610 may assist in securing one or more components within the cavity 1208 of the electronic device 100, such as the second loudspeaker 602, the second PCB 622, and so forth.

As shown, the sleeve 612 includes orifices, such as the second orifices 1408, that provides openings through which sound emitted by loudspeakers of the electronic device 100, such as the fourth loudspeaker 606, to pass through. In some instances, when the sleeve 612 and the cabinet 610 couple together, the orifices may be both near (e.g., vertically and/or horizontally) or adjacent to respective loudspeakers of the electronic device 100. That is, as discussed above, when the cabinet 610 and the sleeve 612 couple together, the first orifices 1406 may align with the third loudspeaker 604, the second orifices 1408 may align with the fourth loudspeaker 606, and the third orifices 1410 may align with the fifth loudspeaker 608.

Once the bottom loudspeaker port 632 couples to the cabinet 610, FIG. 20 illustrates how one or more wires such as the FPCB 1900 and wires 2000 may route around the bottom loudspeaker port 632, between the top portion 212 and the bottom portion 214 of the electronic device 100. For instance, the wires may route along the sides of the electronic device 100, through the voids 1708 and/or the voids 1710 of the bottom loudspeaker port 632. As such, the FPCB 1900 and the wires 2000 for instance, may communicatively couple the top portion 212 to the bottom portion 214.

Figure 21:
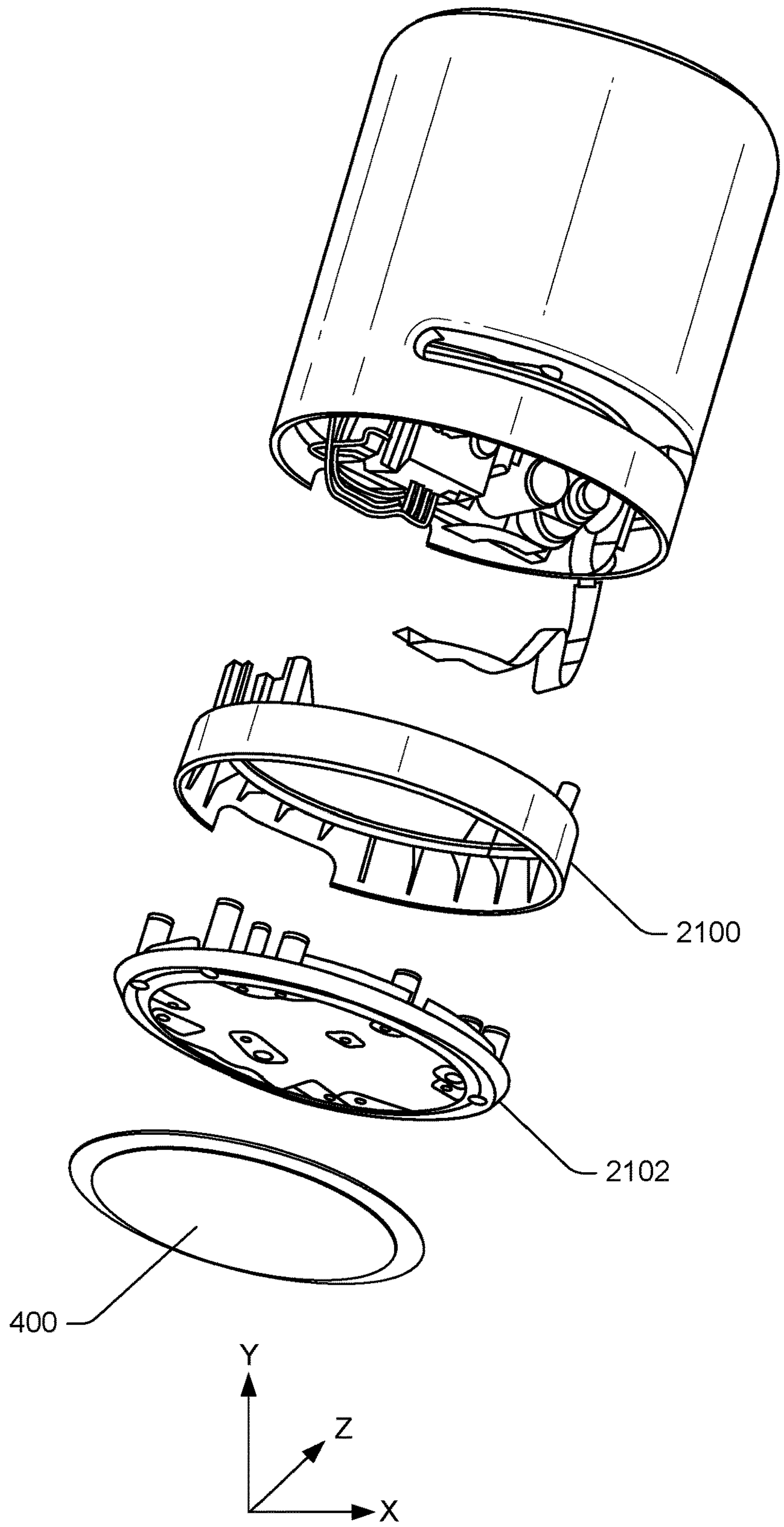
FIG. 21 is a partially exploded view of the example electronic device of FIG. 1, showing one or more components of a bottom portion of the example electronic device, according to an embodiment of the present disclosure.

FIG. 21 illustrates components that may reside within a bottom of the electronic device 100, such as within the bottom portion 214. For instance, the bottom portion 214 may include a frame 2100 and/or a bottom plate 2102 to secure and/or support components residing within the bottom portion 214, such as the port assembly 626, microphones, PCBs, and so forth. To couple the frame 2100 and/or the bottom plate 2102 to the cabinet 610, for instance, one or more screws may be disposed through the frame 2100 and/or the bottom plate 2102 and into the cabinet 610. In some instances, the one or more screws may extend through the one or more columns 1616 in the bottom loudspeaker port 632.

The bottom 104 of the electronic device 100 may include the rubber pad 400 to dampen, absorb, or stabilizes the electronic device 100, preventing the electronic device 100 from rattling, sliding, or repositioning during use. In some instances, the rubber pad 400 may attach to the base plate via adhesives or mechanical fasteners, for instance.

CONCLUSION

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An audio device comprising:

a housing including an interior;

a first cavity disposed within the interior, the first cavity having a first volume;

a second cavity disposed within the interior, the second cavity having a second volume and acoustically sealed from the first cavity, the second volume being greater than the first volume;

a third cavity disposed within the interior, the third cavity having a third volume and acoustically sealed from the first cavity and the second cavity, the third volume being less than the first volume;

a first loudspeaker coupled to the housing and at least partially disposed in the first cavity, the first loudspeaker oriented to emit first sound towards a first side of the audio device;

a second loudspeaker coupled to the housing and at least partially disposed in the second cavity, the second loudspeaker oriented to emit second sound towards a second side of the audio device, the second side being orthogonal to the first side; and a third loudspeaker coupled to the housing and at least partially disposed in the third cavity, the third loudspeaker oriented to emit third sound towards a third side of the audio device, the third side being opposite the first side.

2. The audio device of claim 1, wherein:

the first loudspeaker comprises a first mid-range loudspeaker;

the second loudspeaker comprises a first tweeter loudspeaker or a second mid- range loudspeaker; and the third loudspeaker comprises a second tweeter loudspeaker or a third mid- range loudspeaker.

3. The audio device of claim 1, further comprising:

a fourth loudspeaker coupled to the housing and oriented to emit fourth sound towards a fourth side of the audio device, the fourth side being orthogonal to the second side; and a fifth loudspeaker coupled to the housing and oriented to emit fifth sound towards a fifth side of the audio device, the fifth side being opposite the fourth side.

4. The audio device of claim 3, further comprising:

a fourth cavity disposed within the interior, the fourth cavity being acoustically sealed from the first cavity, the second cavity, and the third cavity;

the fourth loudspeaker is at least partially disposed within the fourth cavity; and the fifth loudspeaker is at least partially disposed within the second cavity.

5. The audio device of claim 1, wherein:

the housing includes an enclosed first end and an open second end; and the first cavity, the second cavity, and the third cavity are disposed more proximate to the enclosed first end than the open second end.

6. The audio device of claim 1, wherein the housing further includes a first exterior, further comprising:

a sleeve at least partially disposed over the first exterior of housing, the sleeve including a second exterior; and a cover disposed at least partially over the second exterior of the sleeve.

7. The audio device of claim 1, wherein:

the housing includes a first end and a second end opposite the first end;

the first loudspeaker, the second loudspeaker, and the third loudspeaker are disposed more proximate to the first end than the second end;

the first cavity is defined at least in part by a first sidewall that extends from the interior in a direction from the first end to the second end;

the second cavity is defined at least in part by a second sidewall that extends from the interior in the direction; and the third cavity is defined at least in part by a third sidewall that extends from the interior in the direction.

8. A device comprising:

a housing including an interior surface and an exterior surface, the housing having:

a first cavity of a first size formed at least in part by the interior surface;

a second cavity of a second size, different than the first size, formed at least in part by the interior surface, the second cavity being separate from the first cavity; and a third cavity of a third size, different than the second size, formed at least in part by the interior surface, the third cavity being separate from the first cavity and the second cavity;

a first loudspeaker coupled to the exterior surface and at least partially disposed within the first cavity, the first loudspeaker oriented to emit first sound outward from the device in a first direction;

a second loudspeaker coupled to the exterior surface and at least partially disposed within the second cavity, the second loudspeaker oriented to emit second sound outward from the device in a second direction that is different from the first direction;

a third loudspeaker coupled to the exterior surface and at least partially disposed within the third cavity, the third loudspeaker oriented to emit third sound outward from the device in a third direction that is different from the second direction; and a cover disposed over at least a portion of the housing, the cover visually concealing the first loudspeaker, the second loudspeaker, and the third loudspeaker.

9. The device of claim 8, wherein:

the first loudspeaker comprises a first mid-range loudspeaker;

the second loudspeaker comprises a first tweeter loudspeaker or a second mid- range loudspeaker; and the third loudspeaker comprises a second tweeter loudspeaker or a third mid- range loudspeaker.

10. The device of claim 8, further comprising at least one of:

a fourth loudspeaker coupled to the housing and oriented to emit fourth sound outward from the device in a fourth direction; and a fifth loudspeaker coupled to the housing and oriented to emit fifth sound outward from the device in a fifth direction.

11. The device of claim 10, wherein:

the second direction is substantially orthogonal to the first direction in a first plane;

the third direction is substantially opposite the first direction in the first plane;

the fourth direction is substantially orthogonal to the first direction in a second plane; and the fifth direction is substantially opposite the fourth direction in the second plane.

12. The device of claim 8, wherein the housing includes:

one or more first sidewalls extending from the interior surface that at least partially define the first cavity;

one or more second sidewalls extending from the interior surface that at least partially define the second cavity; and one or more third sidewalls extending from the interior surface that at least partially define the third cavity.

13. The device of claim 12, wherein:

the second cavity is interposed between the first cavity and the third cavity; and at least one of the one or more first sidewalls and at least one of the one or more third sidewalls at least partially define the second cavity.

14. The device of claim 12, wherein:

the one or more first sidewalls extending from the interior surface include a first length;

the one or more second sidewalls extending from the interior surface include a second length;

the one or more third sidewalls extending from the interior surface include a third length; and at least two of the first length, the second length, and the third length are a same.

15. The device of claim 8, wherein the second cavity is at least partially interposed between the first cavity and the third cavity.

16. A device comprising:

a first loudspeaker oriented to emit first sound outwards from the device in a first direction;

a second loudspeaker oriented to emit second sound outwards from the device in a second direction that is different from the first direction;

a third loudspeaker oriented to emit third sound outwards from the device in a third direction that is different than the second direction;

a unitary housing having an interior surface, wherein the unitary housing includes:

one or more first sidewalls that extend from the interior surface to at least partially form a first back volume for the first loudspeaker, the first back volume having a first size, one or more second sidewalls that extend from the interior surface to at least partially form a second back volume for the second loudspeaker separate from the first back volume, the second back volume having a second size different than the first size, and one or more third sidewalls that extend from the interior surface to at least partially form a third back volume for the third loudspeaker separate from the second back volume, the third back volume having a third size different than the second size; and a seal coupled to the unitary housing, the seal at least partially enclosing the first back volume, the second back volume, and the third back volume at a first location that is spaced apart from a second location at which the one or more first sidewalls, the one or more second sidewalls, and the one or more third sidewalls extend from the interior surface.

17. The device of claim 16, further comprising:

at least one microphone;

one or more processors; and one or more non-transitory computer-readable media storing computer-executable instructions that, when executed by the one or more processors, cause the one or more processors to perform acts comprising:

receiving, from the at least one microphone, an audio signal representing user speech;

sending, to a remote device, at least a portion of the audio signal;

receiving, from the remote device, audio data; and causing output of the audio data on at least one of the first loudspeaker, the second loudspeaker, or the third loudspeaker.

18. The device of claim 16, wherein the seal couples to the one or more first sidewalls, the one or more second sidewalls, and the one or more third sidewalls.

19. The device of claim 16, wherein:

the first back volume is enclosed by:

the interior surface of the unitary housing, the one or more first sidewalls, and the seal;

the second back volume is enclosed by:

the interior surface of the unitary housing, the one or more second sidewalls, and the seal; and the third back volume is enclosed by:

the interior surface of the unitary housing, the one or more third sidewalls, and the seal.

20. The device of claim 16, wherein:

the second size is larger than the first size; and the third size is larger than the second size.

* * * * *